United States Patent
Jung

(10) Patent No.: US 9,977,625 B2
(45) Date of Patent: May 22, 2018

(54) DATA PROCESSING SYSTEM

(71) Applicant: SK hynix Inc., Gyeonggi-do (KR)

(72) Inventor: Byung-Soo Jung, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 192 days.

(21) Appl. No.: 15/050,135

(22) Filed: Feb. 22, 2016

(65) Prior Publication Data
US 2017/0097794 A1  Apr. 6, 2017

(30) Foreign Application Priority Data
Oct. 5, 2015  (KR) .................. 10-2015-0139452

(51) Int. Cl.
*G06F 3/06* (2006.01)
*G06F 12/10* (2016.01)
*G06F 12/1009* (2016.01)

(52) U.S. Cl.
CPC ............ *G06F 3/0659* (2013.01); *G06F 3/061* (2013.01); *G06F 3/064* (2013.01); *G06F 3/0611* (2013.01); *G06F 3/0625* (2013.01); *G06F 3/0652* (2013.01); *G06F 3/0688* (2013.01); *G06F 12/1009* (2013.01); *G06F 2212/2022* (2013.01); *G06F 2212/7201* (2013.01); *G06F 2212/7205* (2013.01)

(58) Field of Classification Search
CPC ......... G06F 12/0246; G06F 2212/7202; G06F 3/061; G06F 3/0659; G06F 13/1668; G06F 2212/2022; G06F 2212/7205; G06F 3/0652; G06F 12/1009; G06F 2212/7201; G06F 3/0611; G06F 3/0625; G06F 3/064; G06F 3/0688; Y02B 60/1228

See application file for complete search history.

(56) References Cited

U.S. PATENT DOCUMENTS

| | | | |
|---|---|---|---|
| 6,934,796 B1 * | 8/2005 | Pereira | G11C 15/00 365/49.17 |
| 9,582,196 B2 * | 2/2017 | Park | G06F 13/1668 |
| 2007/0118688 A1 | 5/2007 | Lee et al. | |
| 2011/0016261 A1 * | 1/2011 | Lin | G06F 12/0246 711/103 |
| 2016/0216887 A1 * | 7/2016 | Fukuda | G06F 3/061 |

* cited by examiner

*Primary Examiner* — Zhou Li
(74) *Attorney, Agent, or Firm* — IP & T Group LLP

(57) ABSTRACT

A data processing system may include at least two memory systems including first and second memory systems to which a logical address and a command are applied in parallel from a host. The first memory system may store a plurality of first physical addresses for physically indicating a plurality of first pages included in a first non-volatile memory device as a first table, and determines whether to perform a preset operation corresponding to the applied command according to whether a physical address generated by performing a preset operation on the applied logical address exists in the first table, and the second memory system may store a plurality of second physical addresses for physically indicating a plurality of second pages included in a second non-volatile memory device as a second table, and determines whether to perform the preset operation corresponding to the applied command according to whether a physical address generated by performing the preset operation on the applied logical address exists in the second table.

21 Claims, 17 Drawing Sheets

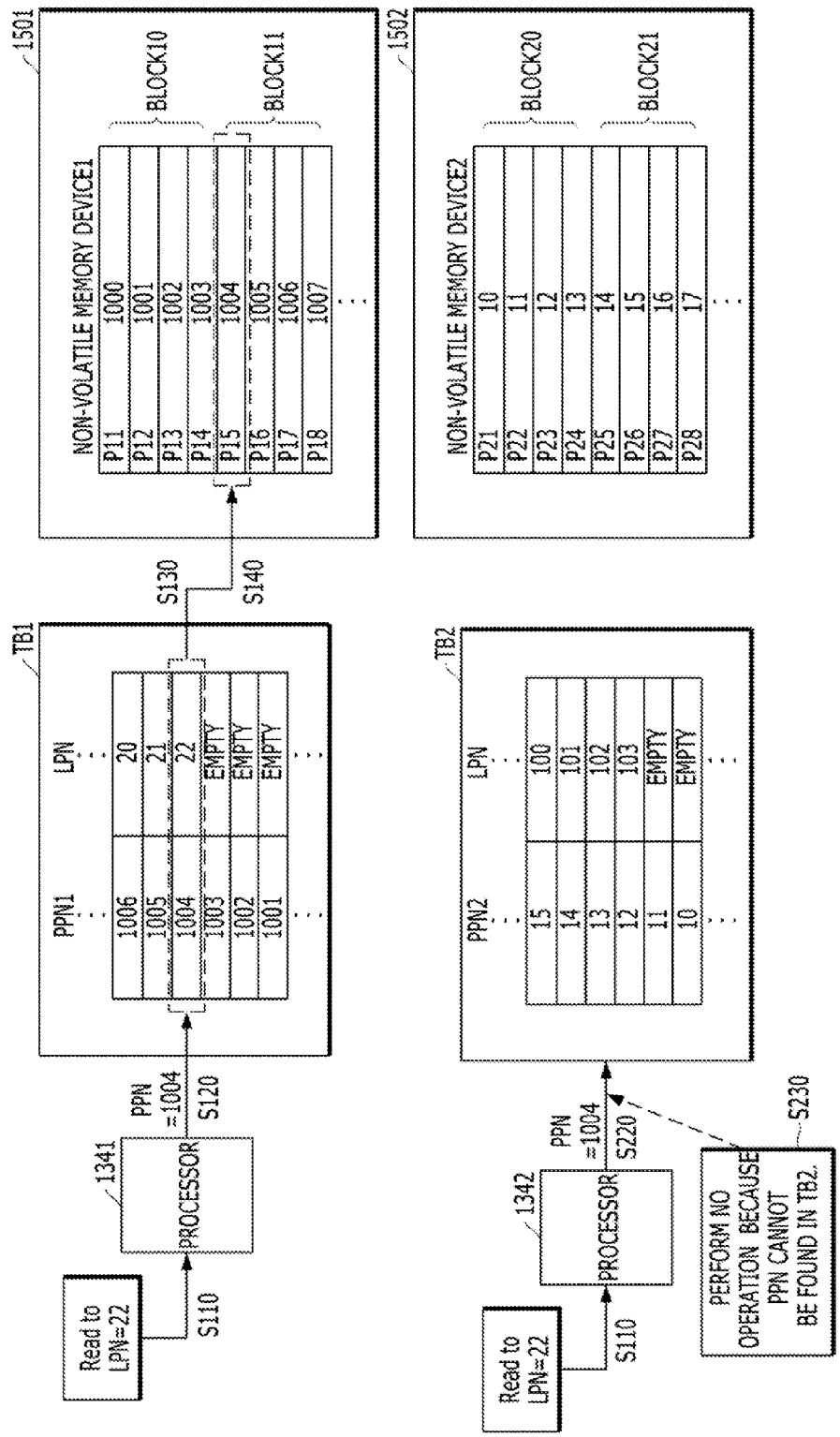

DATA PROCESSING SYSTEM

CROSS-REFERENCE TO RELATED APPLICATIONS

This application claims priority under 35 U.S.C. § 119 to Korean Patent Application No. 10-2015-0139452, filed on Oct. 5, 2015 in the Korean Intellectual Property Office, the disclosure of which is incorporated herein by reference in its entirety.

BACKGROUND

1. Field

Exemplary embodiments of the present invention relate to a semiconductor design technology and, more particularly, to a data processing system including a plurality of memory systems.

2. Description of the Related Art

The computer environment paradigm has shifted to ubiquitous computing systems that can be used anywhere and at any time. As a result, the use of portable electronic devices such as mobile phones, digital cameras, and notebook computers has been increasing rapidly. Generally, these portable electronic devices use a memory system having a memory device, that is, a data storage device. A data storage device may be used as a main or an auxiliary memory device of a portable electronic device.

Data storage devices using semiconductor based memory devices provide excellent stability, durability, high information access speed, and low power consumption since they have no moving parts. Examples of data storage devices having such advantages include universal serial bus (USB) memory devices, memory cards having various interfaces, and solid state drives (SSD).

SUMMARY

Various embodiments are directed to a data processing system capable of readily searching a physical address corresponding to a logical address applied from a host, even when the data processing system includes a plurality of memory systems operating in parallel to each other.

In an embodiment, a data processing system may include at least two memory systems including first and second memory systems to which a logical address and a command are applied in parallel from a host. The first memory system may store a plurality of first physical addresses for physically indicating a plurality of first pages included in a first non-volatile memory device as a first table, and determines whether to perform a preset operation corresponding to the applied command according to whether a physical address generated by performing a preset operation on the applied logical address exists in the first table, and the second memory system may store a plurality of second physical addresses for physically indicating a plurality of second pages included in a second non-volatile memory device as a second table, and determines whether to perform the preset operation corresponding to the applied command according to whether a physical address generated by performing the preset operation on the applied logical address exists in the second table.

The first memory system may include: the first non-volatile memory device comprising the plurality of first pages, and suitable for storing the first table; and a first controller suitable for generating a physical address by performing the preset operation on the applied logical address, checking whether the generated physical address exists in the first table stored in the first non-volatile memory device, and determining whether to perform the predetermined operation corresponding to the command according to the check result.

The second memory system may include: the second non-volatile memory device comprising the plurality of second pages, and suitable for storing the second table; and a second controller suitable for generating a physical address by performing the preset operation on the applied logical address, checking whether the generated physical address exists in the second table stored in the second non-volatile memory device, and determining whether to perform the predetermined operation corresponding to the command according the check result.

Each of the first and second memory systems may generate the physical address by performing the preset operation on the applied logical address in simultaneously.

The first table may store the logical addresses for generating the plurality of first physical addresses through the preset operation in a state where the logical addresses correspond to the respective first physical addresses.

When the preset operation corresponding to the applied command is a write operation, the first memory system may compare the physical address generated by performing the preset operation on the applied logical address to the plurality of first physical addresses, and checks whether there exists a first physical address coinciding with the physical address, when the first physical address coinciding with the physical address may exist, the first memory system may recheck whether the logical address connected to the corresponding first physical address exists, when the logical address connected to the corresponding first physical address does not exist, the first memory system may store the applied logical address in the first table in a state where the applied logical address is connected to the corresponding first physical address, and when the logical address connected to the corresponding first physical address exists, the first memory system may change a first page corresponding to the corresponding first physical address among the plurality of first pages to an invalid state, and transmits the information to the host.

When the predetermined operation corresponding to the applied command is a read operation, the first memory system may compare the physical address generated by performing the preset operation on the applied logical address to the plurality of first physical addresses, and checks whether there exists a first physical address coinciding with the physical address, when the first physical address coinciding with the physical address exists, the first memory system may recheck whether the logical address connected to the corresponding first physical address coincides with the applied logical address, and when the logical address coincides with the applied logical address, the first memory system may perform the read operation from the first non-volatile memory device using the corresponding first physical address.

The first table may store duplication indication information indicating whether the logical addresses connected to the respective first physical addresses are duplicated, in a state where the duplication indication information is connected to the respective first physical addresses.

When the preset operation corresponding to the applied command is a write operation, the first memory system may compare the physical address generated by performing the preset operation on the applied logical address to the plurality of first physical addresses, and checks whether there exists a first physical address coinciding with the physical address, when the first physical address coinciding with the physical address exists, the first memory system may recheck whether the logical address connected to the corresponding first physical address exists, when the logical address connected to the corresponding first physical address does not exist, the first memory system may store the applied logical address and the duplication indication information in the first table in a state where the value of the applied logical address and the initial value of the duplication indication information are connected to the corresponding first physical address, and when the logical address connected to the corresponding first physical address exists, the first memory system may select any one first physical address having no logical address connected thereto among the plurality of first physical addresses, stores the value of the selected first physical address as the duplication indication information connected to the corresponding first physical address, and stores the applied logical address and the duplication indication information in the first table in a state where the value of the applied logical address and the initial value of the duplication indication information are connected to the selected first physical address.

When the preset operation corresponding to the applied command is a read operation, the first memory system may compare the physical address generated by performing the preset operation on the applied logical address to the plurality of first physical addresses, and checks whether there exists a first physical address coinciding with the physical address, when the first physical address coinciding with the physical address exists, the first memory system may recheck whether the duplication indication information connected to the corresponding first physical address has the initial value, when the duplication indication information has the initial value, the first memory system may recheck whether the logical address connected to the corresponding first physical address coincides with the applied logical address, and performs the read operation from the first non-volatile memory device using the corresponding first physical address only in case where the logical address coincides with the applied logical address, and when the duplication indication information does not have the initial value, the first memory system may select a physical address having the same value as the duplication indication information connected to the corresponding first physical address among the plurality of first physical addresses, sets the selected first physical address to the corresponding first physical address, and repeats the rechecking operation until the duplication indication information connected to the corresponding first physical address becomes the initial value.

The second table may store the logical addresses for generating the plurality of second physical addresses through the preset operation in a state where the logical addresses correspond to the respective second physical addresses.

When the preset operation corresponding to the applied command is a write operation, the second memory system may compare the physical address generated by performing the preset operation on the applied logical address to the plurality of second physical addresses, and checks whether there exists a second physical address coinciding with the physical address, when the second physical address coinciding with the physical address may exist, the second memory system may recheck whether the logical address connected to the corresponding second physical address exists, when the logical address connected to the corresponding second physical address does not exist, the second memory system may store the applied logical address in the second table in a state where the applied logical address is connected to the corresponding second physical address, and when the logical address connected to the corresponding second physical address exists, the second memory system may change a second page corresponding to the corresponding second physical address among the plurality of second pages to an invalid state, and transmits the information to the host.

When the predetermined operation corresponding to the applied command is a read operation, the second memory system may compare the physical address generated by performing the preset operation on the applied logical address to the plurality of second physical addresses, and checks whether there exists a second physical address coinciding with the physical address, when the second physical address coinciding with the physical address exists, the second memory system may recheck whether the logical address connected to the corresponding second physical address coincides with the applied logical address, and when the logical address coincides with the applied logical address, the second memory system may perform the read operation from the second non-volatile memory device using the corresponding second physical address.

The second table may store duplication indication information indicating whether the logical addresses connected to the respective second physical addresses are duplicated, in a state where the duplication indication information is connected to the plurality of second physical addresses.

When the preset operation corresponding to the applied command is a write operation, the second memory system may compare the physical address generated by performing the preset operation on the applied logical address to the plurality of second physical addresses, and checks whether there exists a second physical address coinciding with the physical address, when the second physical address coinciding with the physical address exists, the second memory system may recheck whether the logical address connected to the corresponding second physical address exists, when the logical address connected to the corresponding second physical address does not exist, the second memory system may store the applied logical address and the duplication indication information in the second stable in a state where the value of the logical address and the initial value of the duplication indication information are connected to the corresponding second physical address, and when the logical address connected to the corresponding second physical address exists, the second memory system may select any one second physical address having no logical address connected thereto among the plurality of second physical addresses, stores the selected second physical address as the duplication indication information connected to the corresponding second physical address, and stores the applied logical address and the duplication indication information in the second table in a state where the value of the applied logical address and the initial value of the duplication indication information are connected to the selected second physical address.

When the preset operation corresponding to the applied command is a read operation, the second memory system may compare the physical address generated by performing the preset operation on the applied logical address to the plurality of second physical addresses, and checks whether there exists a second physical address coinciding with the physical address, when the second physical address coinciding with the physical address exists, the second memory system may recheck whether the duplication indication information connected to the corresponding second physical address has the initial value, when the duplication indication information has the initial value, the second memory system may recheck whether the logical address connected to the corresponding second physical address coincides with the applied logical address, and performs the read operation from the second non-volatile memory device using the corresponding second physical address only in case where the logical address connected to the corresponding second physical address coincides with the applied logical address, and when the duplication indication information does not have the initial value, the second memory system may select a second physical address having the same value as the duplication information connected to the corresponding second physical address among the plurality of second physical addresses, sets the selected second physical address to the corresponding second physical address, and repeats the rechecking operation until the duplication indication information connected to the corresponding second physical address becomes the initial value.

The preset operation may include a hash operation for selecting and generating any one physical address among the plurality of first physical addresses and the plurality of second physical addresses in response to the values of the applied logical addresses of which the number corresponds to the sum of the number of the first physical addresses and the number of the second physical address.

The preset operation may include a binary search operation for selecting and generating any one physical address among the plurality of first physical addresses and the plurality of second physical addresses in response to the values of the applied logical addresses of which the number corresponds to the sum of the number of the first physical addresses and the number of the second physical address.

BRIEF DESCRIPTION OF THE DRAWINGS

FIGS. 15A to 15E are diagrams illustrating an address mapping method of the data processing system of FIG. 14, according to embodiments of the invention.

DETAILED DESCRIPTION

Figure 1:
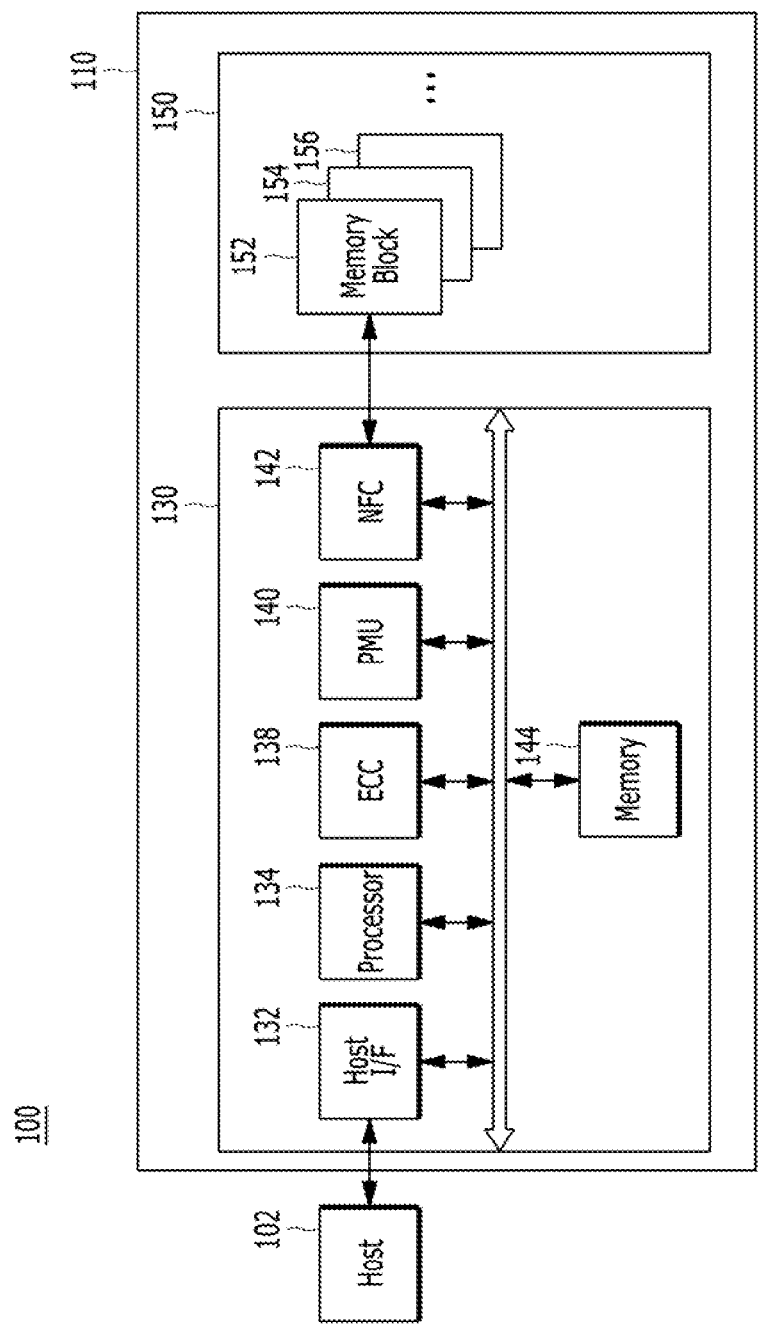
FIG. 1 is a diagram illustrating a data processing system including a memory system, according to an embodiment of the invention.

Various embodiments will be described below in more detail with reference to the accompanying drawings. The present invention may, however, be embodied in different forms and should not be construed as being limited to the embodiments set forth herein. Rather, these embodiments are provided so that this disclosure will be thorough and complete, and will fully convey the present invention to those skilled in the art. Throughout the disclosure, like reference numerals refer to like parts throughout the various figures and embodiments of the present invention.

Referring to FIG. 1 a data processing system is provided, according to an embodiment of the invention. The data processing system 100 may include a host 102 and a memory system 110.

The host 102 may include, for example, a portable electronic device such as a mobile phone, an MP3 player and a laptop computer or an electronic device such as a desktop computer, a game player, a TV and a projector.

The memory system 110 may operate in response to a request from the host 102. The memory system may, for example, store data to be accessed by the host 102. The memory system 110 may be used as a main memory system or an auxiliary memory system of the host 102. The memory system 110 may be electrically coupled with the host 102 according to a protocol of a host interface 132. The memory system 110 may be implemented with any one of various kinds of storage devices such as a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and so forth.

The storage devices for the memory system 110 may be implemented with a volatile memory device, such as a dynamic random access memory (DRAM) and a static random access memory (SRAM). The storage devices for the memory system 110 may be implemented with a non-volatile memory device, such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and a resistive RAM (RRAM).

The memory system 110 may include a memory device 150 for storing data to be accessed by the host 102. The memory system 110 may include a controller 130 for controlling storage of data in the memory device 150.

The controller 130 and the memory device 150 may be integrated into a single semiconductor device. For instance, the single semiconductor device may be a solid state drive (SSD). When the memory system 110 is used as a SSD, the operation speed of the host 102 may be significantly increased.

The controller 130 and the memory device 150 may be integrated into a single semiconductor device, configured as a memory card. The controller 130 and the memory card 150 may be integrated into a single semiconductor device, configured as a memory card, such as a Personal Computer Memory Card International Association (PCMCIA) card, a compact flash (CF) card, a smart media (SM) card (SMC), a memory stick, a multimedia card (MMC), an RS-MMC and a micro-MMC, a secure digital (SD) card, a mini-SD, a micro-SD and an SDHC, and a universal flash storage (UFS) device.

For another instance, the memory system 110 may be configured as a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, or one of various component elements configuring a computing system.

The memory device 150 of the memory system 110 may retain stored data when power supply is interrupted. For example, the memory device 150 may store data provided from the host 102 during a write operation. The memory device may, also for example, provide stored data to the host 102 during a read operation. The memory device 150 may include a plurality of memory blocks 152, 154 and 156. Each of the memory blocks 152, 154 and 156 may include a plurality of pages. Each of the pages may include a plurality of memory cells to which a plurality of word lines (WL) are electrically coupled.

The memory device 150 may be a nonvolatile memory device, for example, a flash memory. The flash memory may have a three-dimensional (3D) stack structure. The structure of the memory device 150 and the three-dimensional (3D) stack structure of the memory device 150 will be described later in more detail with reference to FIGS. 2 to 11.

The controller 130 of the memory system 110 may control the memory device 150 in response to a request from the host 102. For example, the controller 130 may provide data read from the memory device 150, to the host 102, and store data provided from the host 102 into the memory device 150. To this end, the controller 130 may control the overall operations of the memory device 150, such as read, write, program and erase operations.

In an embodiment, the controller 130 may include a host interface unit 132, a processor 134, an error correction code (ECC) unit 138, a power management unit 140, a NAND flash controller 142, and a memory 144.

The host interface unit 132 may process commands and data provided from the host 102, and may communicate with the host 102 through at least one of various interface protocols, such as a universal serial bus (USB), a multimedia card (MMC), a peripheral component interconnect-express (PCI-E), a serial attached SCSI (SAS), a serial advanced technology attachment (SATA), a parallel advanced technology attachment (PATA), a small computer system interface (SCSI), an enhanced small disk interface (ESDI), and an integrated drive electronics (IDE).

The ECC unit 138 may detect and correct errors in the data read from the memory device 150 during a read operation. The ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on a coded modulation, such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and or the like. The ECC unit 138 may include all circuits, systems or devices for the error correction operation.

The PMU 140 may provide and manage power for the controller 130, that is, power for the component elements included in the controller 130.

The NFC 142 may serve as a memory interface between the controller 130 and the memory device 150 to allow the controller 130 to control the memory device 150 in response to a request from the host 102. The NFC 142 may generate control signals for the memory device 150 and process data under the control of the processor 134 when the memory device 150 is a flash memory and, in particular, when the memory device 150 is a NAND flash memory.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150 for such operations as read, write, program and erase operations.

The memory 144 may be implemented with volatile memory. The memory 144 may be implemented with a static random access memory (SRAM) or a dynamic random access memory (DRAM). As described above, the memory 144 may store data used by the host 102 and the memory device 150 for the read and write operations. For storing the data, the memory 144 may include a program memory, a data memory, a write buffer, a read buffer, a map buffer, and so forth.

The processor 134 may control general operations of the memory system 110, and a write operation or a read operation for the memory device 150, in response to a write request or a read request from the host 102. The processor 134 may drive firmware, which is referred to as a flash translation layer (FTL), to control the general operations of the memory system 110. The processor 134 may be implemented with a microprocessor or a central processing unit (CPU).

A management unit (not shown) may be included in the processor 134, and may perform bad block management of the memory device 150. The management unit may find bad memory blocks included in the memory device 150, which are in unsatisfactory condition for further use, and perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. Also, the bad blocks due to the program fail seriously deteriorates the utilization efficiency of the memory device 150 having a 3D stack structure and the reliability of the memory system 100, and thus reliable bad block management is required.

Figure 2:
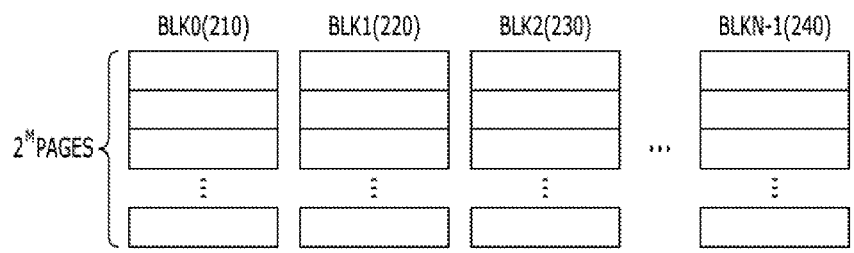
FIG. 2 is a diagram illustrating a memory device of a memory system, according to an embodiment of the invention.

Referring now to FIG. 2, according to an embodiment, the memory device 150 may include a plurality of memory blocks, for example, zeroth to $(N-1)^{th}$ blocks 210 to 240. Each of the plurality of memory blocks 210 to 240 may include a plurality of pages, for example, $2^M$ number of pages ($2^M$ PAGES), to which the present invention will not be limited. Each of the plurality of pages may include a plurality of memory cells to which a plurality of word lines may be coupled electrically.

Also, the memory device 150 may include a plurality of memory blocks, such as single level cell (SLC) memory blocks and or multi-level cell (MLC) memory blocks, according to the number of bits which may be stored or expressed in each memory cell. A SLC memory block may include a plurality of pages including memory cells, each memory cell being capable of storing 1-bit data. The MLC memory block may include a plurality of pages with memory cells each memory cell being capable of storing multi-bit data, for example, two or more-bit data. An MLC memory block including a plurality of pages which are implemented with memory cells that are each capable of storing 3-bit data may be defined as a triple level cell (TLC) memory block.

Each of the plurality of memory blocks 210 to 240 may store data provided from the host device 102 during a write operation, and may also provide stored data to the host 102 during a read operation.

Figure 3:
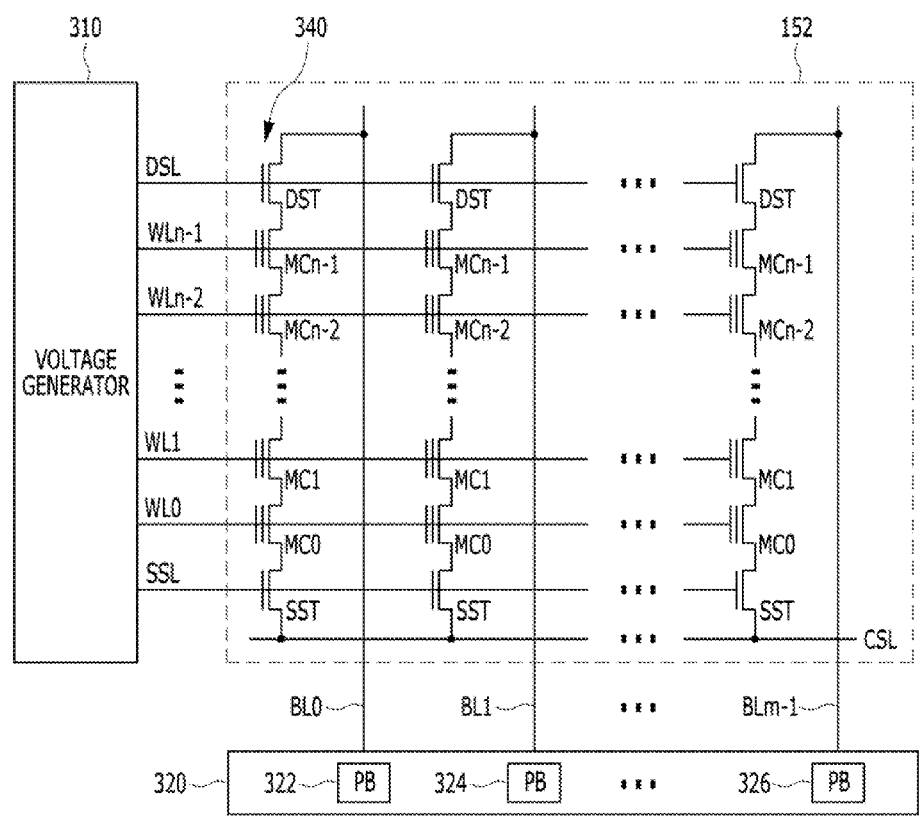
FIG. 3 is a circuit diagram illustrating a memory block of a memory device, according to an embodiment of the invention.

FIG. 3 is a circuit diagram illustrating one of the plurality of memory blocks 152 to 156 shown in FIG. 1.

Referring to FIG. 3, the memory block 152 of the memory device 150 may include a plurality of cell strings 340 electrically coupled to bit lines BL0 to BLm−1, respectively. The cell string 340 of each column may include at least one drain select transistor DST and at least one source select transistor SST. A plurality of memory cells or a plurality of memory cell transistors MC0 to MCn−1 may be electrically coupled in series between the select transistors DST and SST. The respective memory cells MC0 to MCn−1 may be configured by multi-level cells (MLC) each MLC storing data information of a plurality of bits. For reference, in FIG. 3, 'DSL' denotes a drain select line, 'SSL' denotes a source select line, and 'CSL' denotes a common source line.

While FIG. 3 shows, as an example, the memory block 152 which is configured by NAND flash memory cells, it is to be noted that the memory block 152 of the memory device 150 is not limited to NAND flash memory and may be realized by NOR flash memory, hybrid flash memory in which at least two kinds of memory cells are combined, or one-NAND flash memory in which a controller is built in a memory chip. The operational characteristics of a semiconductor device may be applied to not only a flash memory device having a charge storing layer configured by conductive floating gates but also to a charge trap flash (CTF) having a charge storing layer configured by a dielectric layer.

A voltage supply block 310 of the memory device 150 may provide word line voltages, for example, a program voltage, a read voltage and a pass voltage, to be supplied to respective word lines according to an operation mode and voltages to be supplied to bulks, for example, well regions in which the memory cells are formed. The voltage supply block 310 may perform a voltage generating operation under the control of a control circuit (not shown). The voltage supply block 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit, and may serve as a sense amplifier or a write driver according to an operation mode. During a verification/normal read operation, the read/write circuit 320 may serve as a sense amplifier for reading data from the memory cell array. Also, during a program operation, the read/write circuit 320 may serve as a write driver which drives bit lines according to data to be stored in the memory cell array. The read/write circuit 320 may receive data to be written in the memory cell array, from a buffer (not shown), during a program operation, and may drive the bit lines according to the inputted data. To this end, the read/write circuit 320 may include a plurality of page buffers 322, 324 and 326 respectively corresponding to columns (or bit lines) or pairs of columns (or pairs of bit lines). A plurality of latches (not shown) may be included in each of the page buffers 322, 324 and 326.

Figure 4:
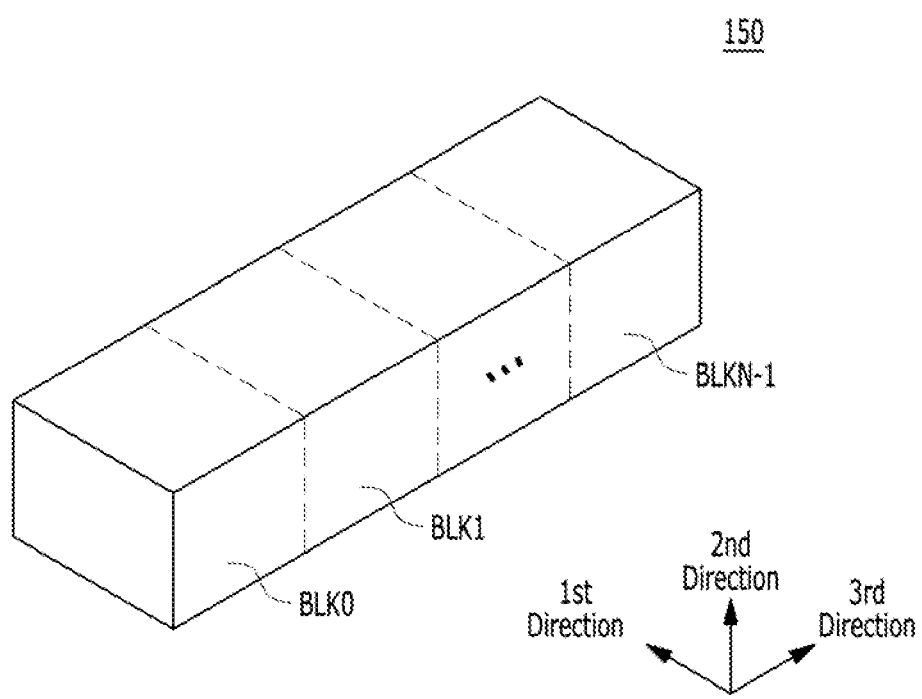
FIGS. 4, 5, 6, 7, 8, 9, 10, and 11 are diagrams schematically illustrating a memory device, according to various embodiments of the invention.

FIGS. 4 to 11 are schematic diagrams illustrating the memory device 150 shown in FIG. 1. Referring to FIG. 4, the memory device 150 may include a plurality of memory blocks BLK0 to BLKN−1. Each of the memory blocks BLK0 to BLKN−1 may be realized in a three-dimensional (3D) structure or a vertical structure. The respective memory blocks BLK0 to BLKN−1 may include structures extending in first to third directions, for example, an x-axis direction, a y-axis direction and a z-axis direction.

The respective memory blocks BLK0 to BLKN−1 may include a plurality of NAND strings NS extending in the second direction. The plurality of NAND strings NS may be provided in the first direction and the third direction. Each NAND string NS may be electrically coupled to a bit line BL, at least one source select line SSL, at least one ground select line GSL, a plurality of word lines WL, at least one dummy word line DWL, and a common source line CSL. Namely, the respective memory blocks BLK0 to BLKN−1 may be electrically coupled to a plurality of bit lines BL, a plurality of source select lines SSL, a plurality of ground select lines GSL, a plurality of word lines WL, a plurality of dummy word lines DWL, and a plurality of common source lines CSL.

Figure 5:
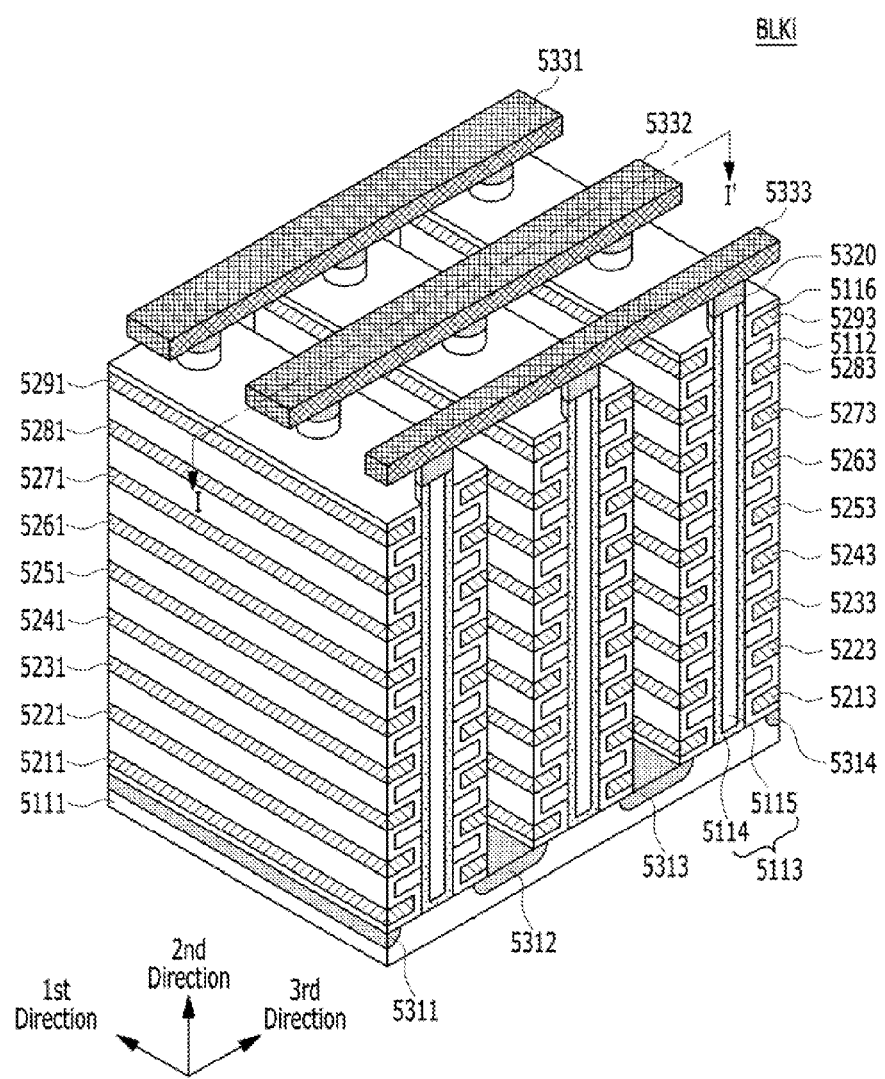
Figure 6:
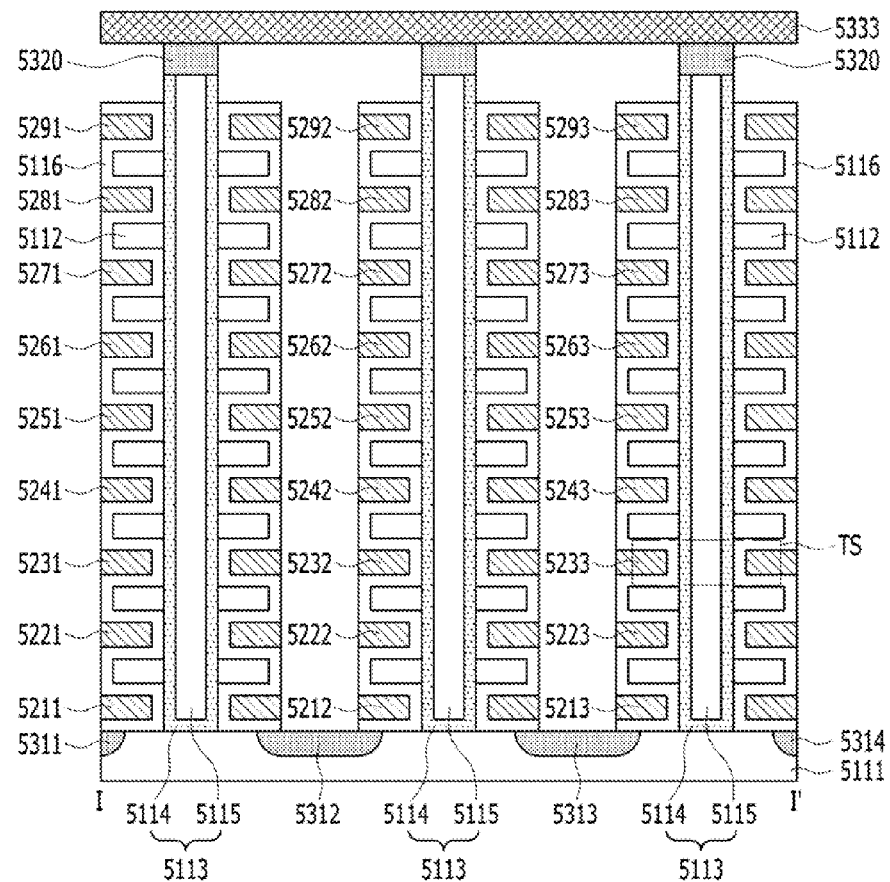

FIG. 5 is a perspective view of a single memory block BLKi of the plural memory blocks BLK0 to BLKN−1 shown in FIG. 4. FIG. 6 is a cross-sectional view taken along a line I-I' of the memory block BLKi shown in FIG. 5.

Referring to FIGS. 5 and 6, a memory block BLKi among the plurality of memory blocks of the memory device 150 may include a structure extending in the first to third directions.

A substrate 5111 may be provided. The substrate 5111 may include a silicon material doped with a first type impurity. The substrate 5111 may include a silicon material doped with a p-type impurity or may be a p-type well, for example, a pocket p-well, and include an n-type well which surrounds the p-type well. While it is assumed that the substrate 5111 is p-type silicon, it is to be noted that the substrate 5111 is not limited to being p-type silicon.

A plurality of doping regions 5311 to 5314 extending in the first direction may be provided at regularly spaced intervals along the 3td direction over the substrate 5111. The plurality of doping regions 5311 to 5314 may contain a second type of impurity that is different from the substrate 5111. The plurality of doping regions 5311 to 5314 may be doped with an n-type impurity. While it is assumed here that first to fourth doping regions 5311 to 5314 are n-type, it is to be noted that the first to fourth doping regions 5311 to 5314 are not limited to being n-type.

In the region over the substrate 5111 between the first and second doping regions 5311 and 5312, a plurality of dielectric materials 5112 extending in the first direction may be sequentially provided in the second direction. The dielectric materials 5112 and the substrate 5111 may be separated from one another by a predetermined distance in the second direction. The dielectric materials 5112 may be separated from one another by a predetermined distance in the second direction. The dielectric materials 5112 may include a dielectric material such as silicon oxide.

In the region over the substrate 5111 between the first and second doping regions 5311 and 5312, a plurality of pillars 5113 which are sequentially disposed at regularly spaced intervals in the first direction and pass through the dielectric materials 5112 in the second direction may be provided. The plurality of pillars 5113 may respectively pass through the dielectric materials 5112 and may be electrically coupled with the substrate 5111. Each pillar 5113 may be configured by a plurality of materials. The surface layer 5114 of each pillar 5113 may include a silicon material doped with the first type of impurity. The surface layer 5114 of each pillar 5113 may include a silicon material doped with the same type of impurity as the substrate 5111. While it is assumed here that the surface layer 5114 of each pillar 5113 may include p-type silicon, the surface layer 5114 of each pillar 5113 is not limited to being p-type silicon.

An inner layer 5115 of each pillar 5113 may be formed of a dielectric material. The inner layer 5115 of each pillar 5113 may be filled by a dielectric material such as silicon oxide.

In the region between the first and second doping regions 5311 and 5312, a dielectric layer 5116 may be provided along the exposed surfaces of the dielectric materials 5112, the pillars 5113 and the substrate 5111. The thickness of the dielectric layer 5116 may be less than half of the distance between the dielectric materials 5112. In other words, a region in which a material other than the dielectric material 5112 and the dielectric layer 5116 may be disposed, may be provided between (i) the dielectric layer 5116 provided over the bottom surface of a first dielectric material of the dielectric materials 5112 and (ii) the dielectric layer 5116 provided over the top surface of a second dielectric material of the dielectric materials 5112. The dielectric materials 5112 may lie below the first dielectric material.

In the region between the first and second doping regions 5311 and 5312, conductive materials 5211 to 5291 may be provided over the exposed surface of the dielectric layer 5116. The conductive material 5211 extending in the first direction may be provided between the dielectric material 5112 adjacent to the substrate 5111 and the substrate 5111. In particular, the conductive material 5211 extending in the first direction may be provided between (i) the dielectric layer 5116 disposed over the substrate 5111 and (ii) the dielectric layer 5116 disposed over the bottom surface of the dielectric material 5112 adjacent to the substrate 5111.

The conductive material extending in the first direction may be provided between (i) the dielectric layer 5116 disposed over the top surface of one of the dielectric materials 5112 and (ii) the dielectric layer 5116 disposed over the bottom surface of another dielectric material of the dielectric materials 5112, which is disposed over the certain dielectric material 5112. The conductive materials 5221 to 5281 extending in the first direction may be provided between the dielectric materials 5112. The conductive material 5291 extending in the first direction may be provided over the uppermost dielectric material 5112. The conductive materials 5211 to 5291 extending in the first direction may be a metallic material. The conductive materials 5211 to 5291 extending in the first direction may be a conductive material such as polysilicon.

In the region between the second and third doping regions 5312 and 5313, the same structures as the structures between the first and second doping regions 5311 and 5312 may be provided. For example, in the region between the second and third doping regions 5312 and 5313, the plurality of dielectric materials 5112 extending in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113, and the plurality of conductive materials 5212 to 5292 extending in the first direction may be provided.

In the region between the third and fourth doping regions 5313 and 5314, the same structures as between the first and second doping regions 5311 and 5312 may be provided. For example, in the region between the third and fourth doping regions 5313 and 5314, the plurality of dielectric materials 5112 extending in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113, and the plurality of conductive materials 5213 to 5293 extending in the first direction may be provided.

Drains 5320 may be respectively provided over the plurality of pillars 5113. The drains 5320 may be silicon materials doped with second type impurities. The drains 5320 may be silicon materials doped with n-type impurities. While it is assumed for the sake of convenience that the drains 5320 include n-type silicon, it is to be noted that the drains 5320 are not limited to being n-type silicon. For example, the width of each drain 5320 may be larger than the width of each corresponding pillar 5113. Each drain 5320 may be provided in the shape of a pad over the top surface of each corresponding pillar 5113.

Conductive materials 5331 to 5333 extending in the third direction may be provided over the drains 5320. The conductive materials 5331 to 5333 may be sequentially disposed in the first direction. The respective conductive materials 5331 to 5333 may be electrically coupled with the drains 5320 of corresponding regions. The drains 5320 and the conductive materials 5331 to 5333 extending in the third direction may be electrically coupled with through contact plugs. The conductive materials 5331 to 5333 extending in the third direction may be a metallic material. The conductive materials 5331 to 5333 extending in the third direction may be a conductive material such as polysilicon.

In FIGS. 5 and 6, the respective pillars 5113 may form strings together with the dielectric layer 5116 and the conductive materials 5211 to 5291, 5212 to 5292 and 5213 to 5293 extending in the first direction. The respective pillars 5113 may form NAND strings NS together with the dielectric layer 5116 and the conductive materials 5211 to 5291, 5212 to 5292 and 5213 to 5293 extending in the first direction. Each NAND string NS may include a plurality of transistor structures TS.

Figure 7:
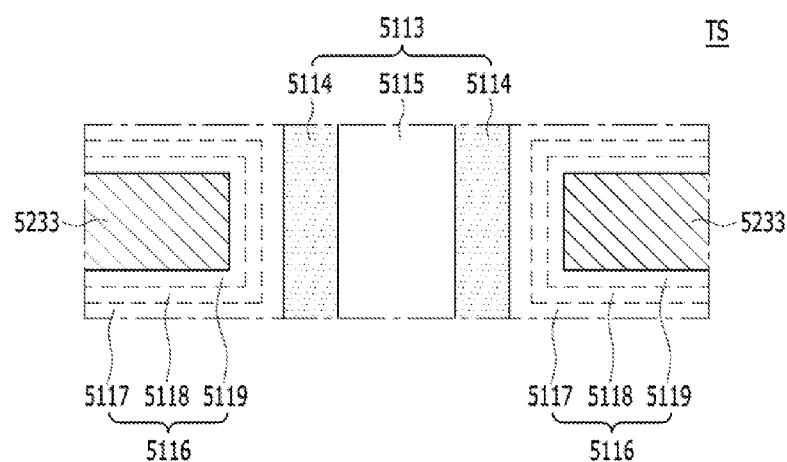

FIG. 7 is a cross-sectional view of the transistor structure TS shown in FIG. 6.

Referring to FIG. 7, in the transistor structure TS shown in FIG. 6, the dielectric layer 5116 may include first to third sub dielectric layers 5117, 5118 and 5119.

The surface layer 5114 of p-type silicon in each of the pillars 5113 may serve as a body. The first sub dielectric layer 5117 adjacent to the pillar 5113 may serve as a tunneling dielectric layer, and may include a thermal oxidation layer.

The second sub dielectric layer 5118 may serve as a charge storing layer. The second sub dielectric layer 5118 may serve as a charge capturing layer, and may include a nitride layer or a metal oxide layer such as an aluminum oxide layer, a hafnium oxide layer, or the like.

The third sub dielectric layer 5119 adjacent to the conductive material 5233 may serve as a blocking dielectric layer. The third sub dielectric layer 5119 adjacent to the conductive material 5233 extending in the first direction may be formed as a single layer or multiple layers. The third sub dielectric layer 5119 may be a high-k dielectric layer such as an aluminum oxide layer, a hafnium oxide layer, or the like, which may have a dielectric constant greater than the first and second sub dielectric layers 5117 and 5118.

The conductive material 5233 may serve as a gate or a control gate. That is, the gate or the control gate 5233, the blocking dielectric layer 5119, the charge storing layer 5118, the tunneling dielectric layer 5117 and the body 5114 may form a transistor or a memory cell transistor structure. For example, the first to third sub dielectric layers 5117 to 5119 may form an oxide-nitride-oxide (ONO) structure. In the embodiment, for the sake of convenience, the surface layer 5114 of p-type silicon in each of the pillars 5113 will be referred to as a body in the second direction.

The memory block BLKi may include the plurality of pillars 5113. Namely, the memory block BLKi may include the plurality of NAND strings NS. In detail, the memory block BLKi may include the plurality of NAND strings NS extending in the second direction or a direction perpendicular to the substrate 5111.

Each NAND string NS may include the plurality of transistor structures TS which are disposed in the second direction. At least one of the plurality of transistor structures TS of each NAND string NS may serve as a string source transistor SST. At least one of the plurality of transistor structures TS of each NAND string NS may serve as a ground select transistor GST.

The gates or control gates may correspond to the conductive materials 5211 to 5291, 5212 to 5292 and 5213 to 5293 extending in the first direction. In other words, the gates or the control gates may extend in the first direction and form word lines and at least two select lines, at least one source select line SSL and at least one ground select line GSL.

The conductive materials 5331 to 5333 extending in the third direction may be electrically coupled to one end of the NAND strings NS. The conductive materials 5331 to 5333 extending in the third direction may serve as bit lines BL. That is, in one memory block BLKi, the plurality of NAND strings NS may be electrically coupled to one bit line BL.

The second type doping regions 5311 to 5314 extending in the first direction may be provided to the other ends of the NAND strings NS. The second type doping regions 5311 to 5314 extending in the first direction may serve as common source lines CSL.

Namely, the memory block BLKi may include a plurality of NAND strings NS extending in a direction perpendicular to the substrate 5111, e.g., the second direction, and may serve as a NAND flash memory block, for example, of a charge capturing type memory, in which a plurality of NAND strings NS are electrically coupled to one bit line BL.

While it is illustrated in FIGS. 5 to 7 that the conductive materials 5211 to 5291, 5212 to 5292 and 5213 to 5293 extending in the first direction are provided in 9 layers, it is to be noted that the conductive materials 5211 to 5291, 5212 to 5292 and 5213 to 5293 extending in the first direction are not limited to being provided in 9 layers. For example, conductive materials extending in the first direction may be provided in 8 layers, 16 layers or any multiple of layers. In other words, in one NAND string NS, the number of transistors may be 8, 16 or more.

While it is illustrated in FIGS. 5 to 7 that 3 NAND strings NS are electrically coupled to one bit line BL, it is to be noted that the embodiment is not limited to having 3 NAND strings NS that are electrically coupled to one bit line BL. In the memory block BLKi, m number of NAND strings NS may be electrically coupled to one bit line BL, m being a positive integer. According to the number of NAND strings NS which are electrically coupled to one bit line BL, the number of conductive materials 5211 to 5291, 5212 to 5292 and 5213 to 5293 extending in the first direction and the number of common source lines 5311 to 5314 may be controlled as well.

Further, while it is illustrated in FIGS. 5 to 7 that 3 NAND strings NS are electrically coupled to one conductive material extending in the first direction, it is to be noted that the embodiment is not limited to having 3 NAND strings NS electrically coupled to one conductive material extending in the first direction. For example, n number of NAND strings NS may be electrically coupled to one conductive material extending in the first direction, n being a positive integer. According to the number of NAND strings NS which are electrically coupled to one conductive material extending in the first direction, the number of bit lines 5331 to 5333 may be controlled as well.

Figure 8:
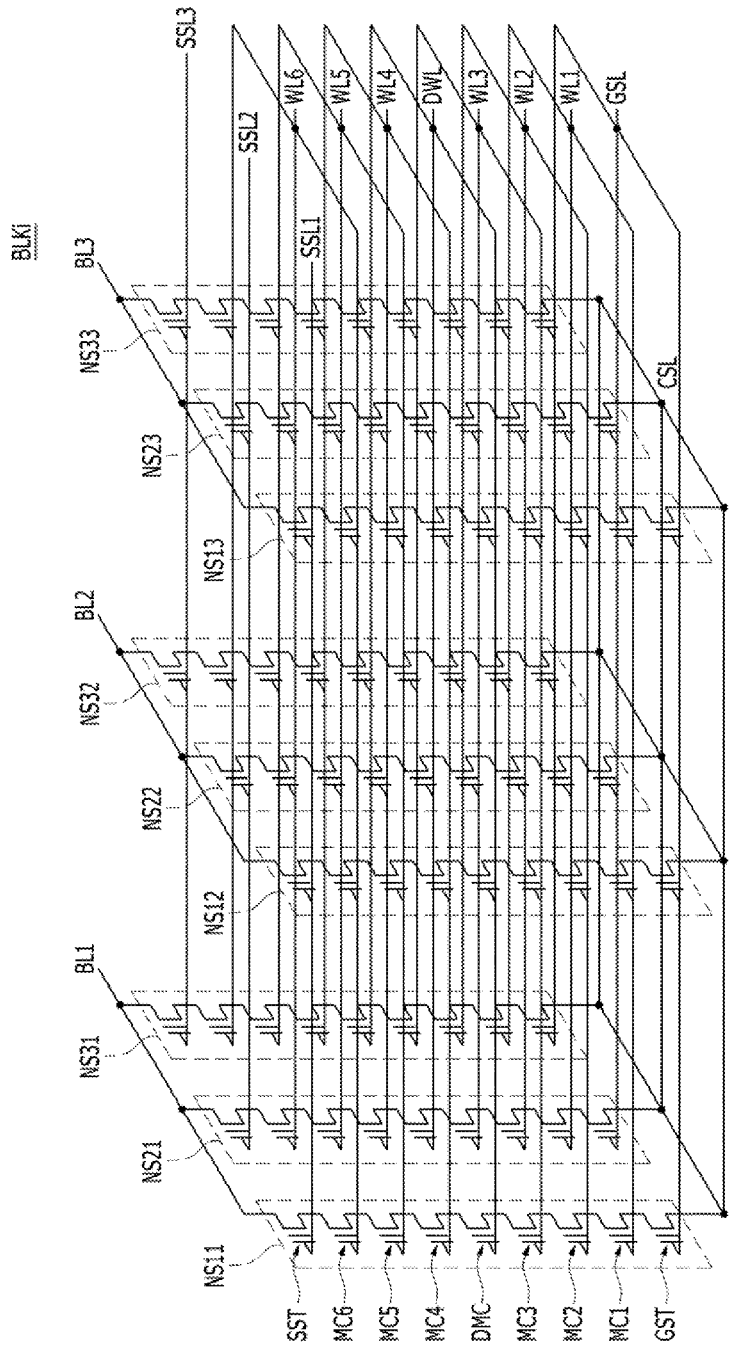

FIG. 8 is an equivalent circuit diagram illustrating the memory block BLKi having a first structure described with reference to FIGS. 5 to 7.

Referring to FIG. 8, in a block BLKi having the first structure, NAND strings NS11 to NS31 may be provided between a first bit line BL1 and a common source line CSL. The first bit line BL1 may correspond to the conductive material 5331 of FIGS. 5 and 6, extending in the third direction. NAND strings NS12 to NS32 may be provided between a second bit line BL2 and the common source line CSL. The second bit line BL2 may correspond to the conductive material 5332 of FIGS. 5 and 6, extending in the third direction. NAND strings NS13 to NS33 may be provided between a third bit line BL3 and the common source line CSL. The third bit line BL3 may correspond to the conductive material 5333 of FIGS. 5 and 6, extending in the third direction.

A source select transistor SST of each NAND string NS may be electrically coupled to a corresponding bit line BL. A ground select transistor GST of each NAND string NS may be electrically coupled to the common source line CSL. Memory cells MC may be provided between the source select transistor SST and the ground select transistor GST of each NAND string NS.

In this example, NAND strings NS may be defined by units of rows and columns and NAND strings NS which are electrically coupled to one bit line may form one column. The NAND strings NS11 to NS31 which are electrically coupled to the first bit line BL1 may correspond to a first column, the NAND strings NS12 to NS32 which are electrically coupled to the second bit line BL2 may correspond to a second column, and the NAND strings NS13 to NS33 which are electrically coupled to the third bit line BL3 may correspond to a third column. NAND strings NS which are electrically coupled to one source select line SSL may form one row. The NAND strings NS11 to NS13 which are electrically coupled to a first source select line SSL1 may form a first row, the NAND strings NS21 to NS23 which are electrically coupled to a second source select line SSL2 may form a second row, and the NAND strings NS31 to NS33 which are electrically coupled to a third source select line SSL3 may form a third row.

In each NAND string NS, a height may be defined. In each NAND string NS, the height of a memory cell MC1 adjacent to the ground select transistor GST may have a value '1'. In each NAND string NS, the height of a memory cell may increase as the memory cell gets closer to the source select transistor SST when measured from the substrate 5111. In each NAND string NS, the height of a memory cell MC6 adjacent to the source select transistor SST may be 7.

The source select transistors SST of the NAND strings NS in the same row may share the source select line SSL. The source select transistors SST of the NAND strings NS in different rows may be respectively electrically coupled to the different source select lines SSL1, SSL2 and SSL3.

The memory cells at the same height in the NAND strings NS in the same row may share a word line WL. That is, at the same height, the word lines WL electrically coupled to the memory cells MC of the NAND strings NS in different rows may be electrically coupled. Dummy memory cells DMC at the same height in the NAND strings NS of the same row may share a dummy word line DWL. Namely, at the same height or level, the dummy word lines DWL electrically coupled to the dummy memory cells DMC of the NAND strings NS in different rows may be electrically coupled.

The word lines WL or the dummy word lines DWL located at the same level or height or layer may be electrically coupled with one another at layers where the conductive materials 5211 to 5291, 5212 to 5292 and 5213 to 5293 extending in the first direction may be provided. The conductive materials 5211 to 5291, 5212 to 5292 and 5213 to 5293 extending in the first direction may be electrically coupled in common to upper layers through contacts. At the upper layers, the conductive materials 5211 to 5291, 5212 to 5292 and 5213 to 5293 extending in the first direction may be electrically coupled. In other words, the ground select transistors GST of the NAND strings NS in the same row may share the ground select line GSL. Further, the ground select transistors GST of the NAND strings NS in different rows may share the ground select line GSL. That is, the NAND strings NS11 to NS13, NS21 to NS23 and NS31 to NS33 may be electrically coupled to the ground select line GSL.

The common source line CSL may be electrically coupled to the NAND strings NS. Over the active regions and over the substrate 5111, the first to fourth doping regions 5311 to 5314 may be electrically coupled. The first to fourth doping regions 5311 to 5314 may be electrically coupled to an upper layer through contacts and, at the upper layer, the first to fourth doping regions 5311 to 5314 may be electrically coupled.

Namely, as shown in FIG. 8, the word lines WL of the same height or level may be electrically coupled. Accordingly, when a word line WL at a specific height is selected, all NAND strings NS which are electrically coupled to the word line WL may be selected. The NAND strings NS in different rows may be electrically coupled to different source select lines SSL. Accordingly, among the NAND strings NS electrically coupled to the same word line WL, by selecting one of the source select lines SSL1 to SSL3, the NAND strings NS in the unselected rows may be electrically isolated from the bit lines BL1 to BL3. In other words, by selecting one of the source select lines SSL1 to SSL3, a row of NAND strings NS may be selected. Moreover, by selecting one of the bit lines BL1 to BL3, the NAND strings NS in the selected rows may be selected in units of columns.

In each NAND string NS, a dummy memory cell DMC may be provided. In FIG. 8, the dummy memory cell DMC may be provided between a third memory cell MC3 and a fourth memory cell MC4 in each NAND string NS. That is, first to third memory cells MC1 to MC3 may be provided between the dummy memory cell DMC and the ground select transistor GST. Fourth to sixth memory cells MC4 to MC6 may be provided between the dummy memory cell DMC and the source select transistor SST. The memory cells MC of each NAND string NS may be divided into memory cell groups by the dummy memory cell DMC. In the divided memory cell groups, memory cells, for example, MC1 to MC3, adjacent to the ground select transistor GST may be referred to as a lower memory cell group, and memory cells, for example, MC4 to MC6, adjacent to the string select transistor SST may be referred to as an upper memory cell group.

Herein below, detailed descriptions will be made with reference to FIGS. 9 to 11, which show the memory device in the memory system according to an embodiment implemented with a three-dimensional (3D) nonvolatile memory device different from the first structure.

Figure 9:
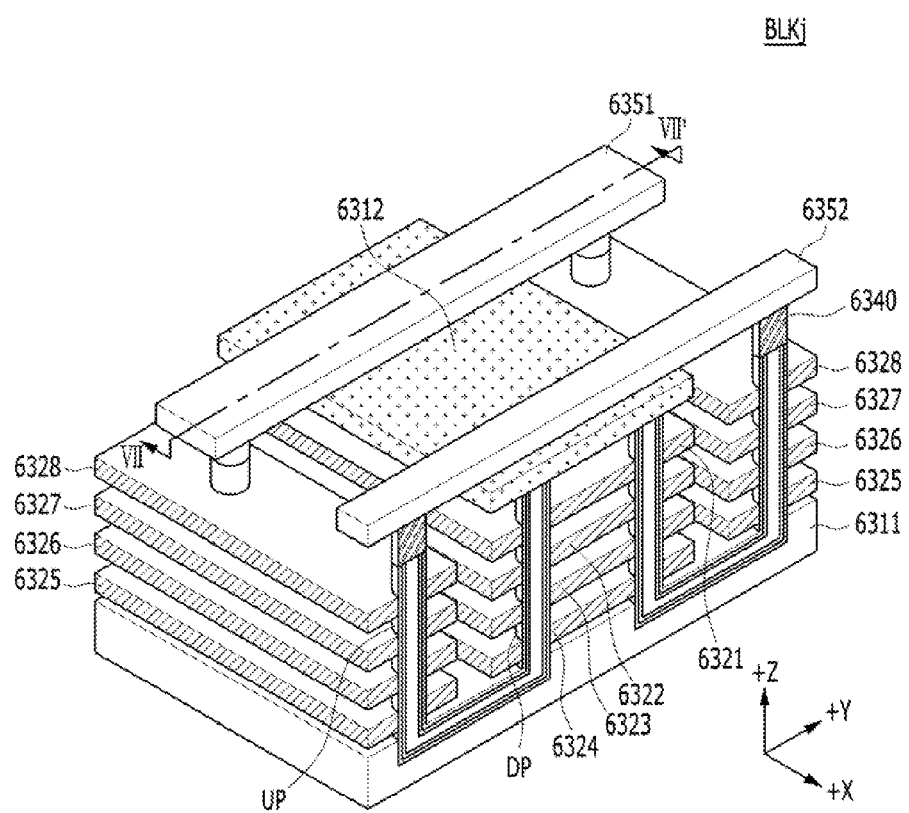

FIG. 9 is a perspective view schematically illustrating the memory device implemented with the three-dimensional (3D) nonvolatile memory device, which is different from the first structure described above with reference to FIGS. 5 to 8, and showing a memory block BLKj of the plurality of memory blocks of FIG. 4. FIG. 10 is a cross-sectional view illustrating the memory block BLKj taken along the line VII-VII' of FIG. 9.

Figure 10:
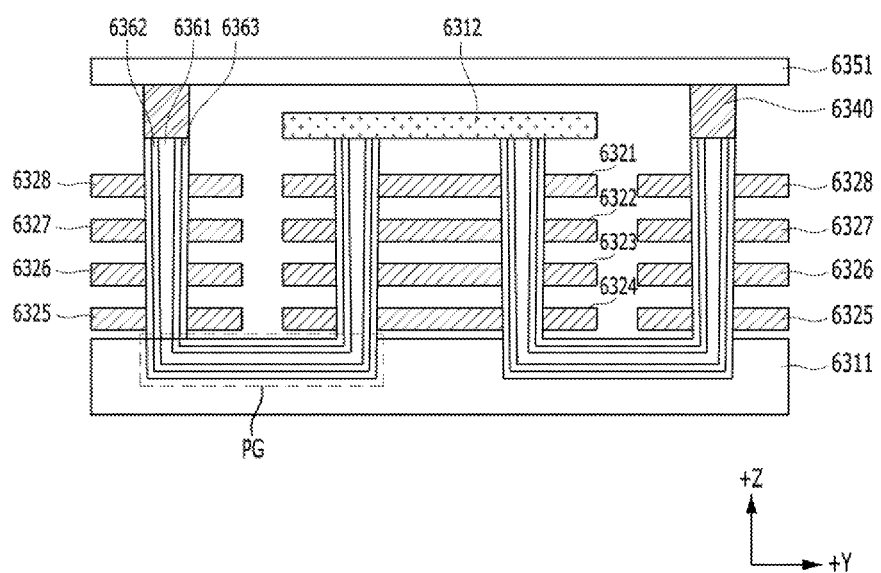

Referring to FIGS. 9 and 10, the memory block BLKj among the plurality of memory blocks of the memory device 150 of FIG. 1 may include structures extending in the first to third directions.

A substrate 6311 may be provided. For example, the substrate 6311 may include a silicon material doped with a first type impurity. For example, the substrate 6311 may include a silicon material doped with a p-type impurity or may be a p-type well, for example, a pocket p-well, and include an n-type well which surrounds the p-type well. While it is assumed in the embodiment for the sake of convenience that the substrate 6311 is p-type silicon, it is to be noted that the substrate 6311 is not limited to being p-type silicon.

First to fourth conductive materials 6321 to 6324 extending in the x-axis direction and the y-axis direction are provided over the substrate 6311. The first to fourth conductive materials 6321 to 6324 may be separated by a predetermined distance in the z-axis direction.

Fifth to eighth conductive materials 6325 to 6328 extending in the x-axis direction and the y-axis direction may be provided over the substrate 6311. The fifth to eighth conductive materials 6325 to 6328 may be separated by the predetermined distance in the z-axis direction. The fifth to eighth conductive materials 6325 to 6328 may be separated from the first to fourth conductive materials 6321 to 6324 in the y-axis direction.

A plurality of lower pillars DP which pass through the first to fourth conductive materials 6321 to 6324 may be provided. Each lower pillar DP extends in the z-axis direction. Also, a plurality of upper pillars UP which pass through the fifth to eighth conductive materials 6325 to 6328 may be provided. Each upper pillar UP extends in the z-axis direction.

Each of the lower pillars DP and the upper pillars UP may include an internal material 6361, an intermediate layer 6362, and a surface layer 6363. The intermediate layer 6362 may serve as a channel of the cell transistor. The surface layer 6363 may include a blocking dielectric layer, a charge storing layer and a tunneling dielectric layer.

The lower pillar DP and the upper pillar UP may be electrically coupled through a pipe gate PG. The pipe gate PG may be disposed in the substrate 6311. For instance, the pipe gate PG may include the same material as the lower pillar DP and the upper pillar UP.

A doping material 6312 of a second type extending in the x-axis direction and the y-axis direction may be provided over the lower pillars DP. For example, the doping material 6312 of the second type may include an n-type silicon material. The doping material 6312 of the second type may serve as a common source line CSL.

Drains 6340 may be provided over the upper pillars UP. The drains 6340 may include an n-type silicon material. First and second upper conductive materials 6351 and 6352 extending in the y-axis direction may be provided over the drains 6340.

The first and second upper conductive materials 6351 and 6352 may be separated in the x-axis direction. The first and second upper conductive materials 6351 and 6352 may be formed of a metal. The first and second upper conductive materials 6351 and 6352 and the drains 6340 may be electrically coupled through contact plugs. The first and second upper conductive materials 6351 and 6352 respectively serve as first and second bit lines BL1 and BL2.

The first conductive material 6321 may serve as a source select line SSL, the second conductive material 6322 may serve as a first dummy word line DWL1, and the third and fourth conductive materials 6323 and 6324 serve as first and second main word lines MWL1 and MWL2, respectively. The fifth and sixth conductive materials 6325 and 6326 serve as third and fourth main word lines MWL3 and MWL4, respectively, the seventh conductive material 6327 may serve as a second dummy word line DWL2, and the eighth conductive material 6328 may serve as a drain select line DSL.

The lower pillar DP and the first to fourth conductive materials 6321 to 6324 adjacent to the lower pillar DP form a lower string. The upper pillar UP and the fifth to eighth conductive materials 6325 to 6328 adjacent to the upper pillar UP form an upper string. The lower string and the upper string may be electrically coupled through the pipe gate PG. One end of the lower string may be electrically coupled to the doping material 6312 of the second type which serves as the common source line CSL. One end of the upper string may be electrically coupled to a corresponding bit line through the drain 6340. One lower string and one upper string form one cell string which is electrically coupled between the doping material 6312 of the second type serving as the common source line CSL and a corresponding one of the upper conductive material layers 6351 and 6352 serving as the bit line BL.

That is, the lower string may include a source select transistor SST, the first dummy memory cell DMC1, and the first and second main memory cells MMC1 and MMC2. The upper string may include the third and fourth main memory cells MMC3 and MMC4, the second dummy memory cell DMC2, and a drain select transistor DST.

In FIGS. 9 and 10, the upper string and the lower string may form a NAND string NS, and the NAND string NS may include a plurality of transistor structures TS. Since the transistor structure included in the NAND string NS in FIGS. 9 and 10 is described above in detail with reference to FIG. 7, a detailed description thereof will be omitted herein.

Figure 11:
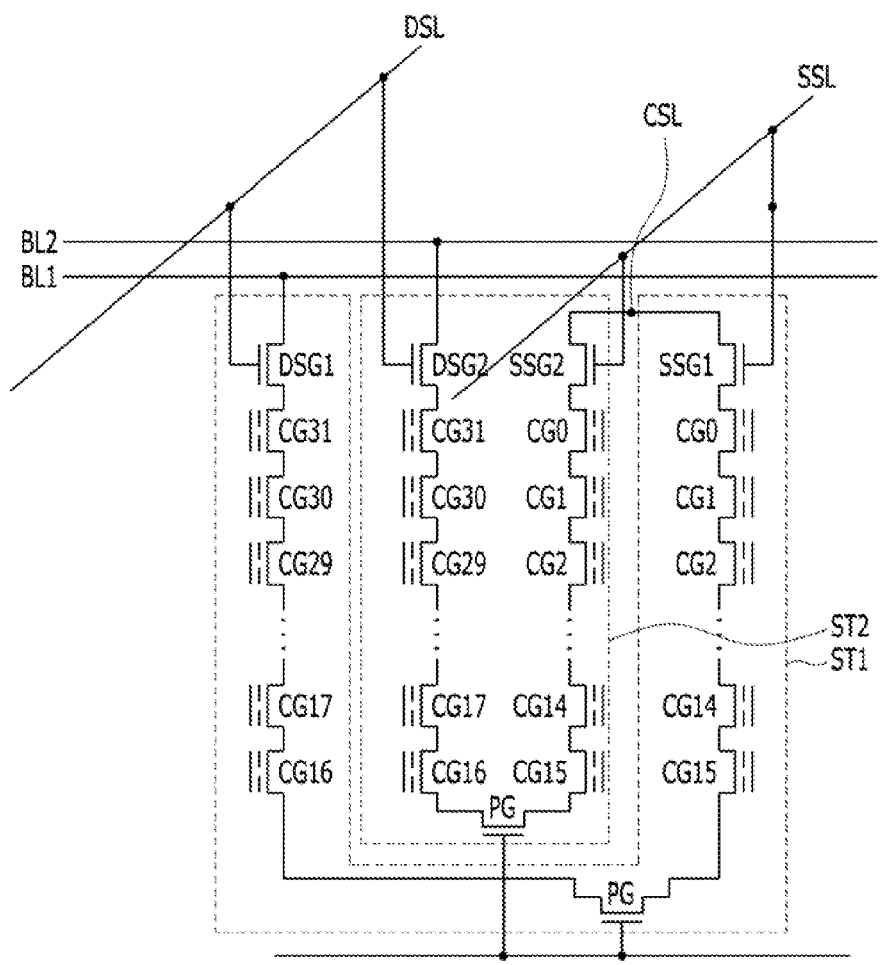

FIG. 11 is a circuit diagram illustrating the equivalent circuit of the memory block BLKj having the second structure as described above with reference to FIGS. 9 and 10. For the sake of convenience, only a first string and a second string, which form a pair in the memory block BLKj in the second structure are shown.

Referring to FIG. 11, in the memory block BLKj having the second structure among the plurality of blocks of the memory device 150, cell strings, each of which is implemented with one upper string and one lower string electrically coupled through the pipe gate PG as described above with reference to FIGS. 9 and 10, may be provided in such a way as to define a plurality of pairs.

Namely, in the certain memory block BLKj having the second structure, memory cells CG0 to CG31 stacked along a first channel CH1 (not shown), for example, at least one source select gate SSG1 and at least one drain select gate DSG1 may form a first string ST1, and memory cells CG0 to CG31 stacked along a second channel CH2 (not shown), for example, at least one source select gate SSG2 and at least one drain select gate DSG2 may form a second string ST2.

The first string ST1 and the second string ST2 may be electrically coupled to the same drain select line DSL and the same source select line SSL. The first string ST1 may be electrically coupled to a first bit line BL1, and the second string ST2 may be electrically coupled to a second bit line BL2.

While it is described in FIG. 11 that the first string ST1 and the second string ST2 are electrically coupled to the same drain select line DSL and the same source select line SSL, it may be envisaged that the first string ST1 and the second string ST2 may be electrically coupled to the same source select line SSL and the same bit line BL, the first string ST1 may be electrically coupled to a first drain select line DSL1 and the second string ST2 may be electrically coupled to a second drain select line DSL2. Further it may be envisaged that the first string ST1 and the second string ST2 may be electrically coupled to the same drain select line DSL and the same bit line BL, the first string ST1 may be electrically coupled to a first source select line SSL1 and the second string ST2 may be electrically coupled a second source select line SSL2.

Figure 12:
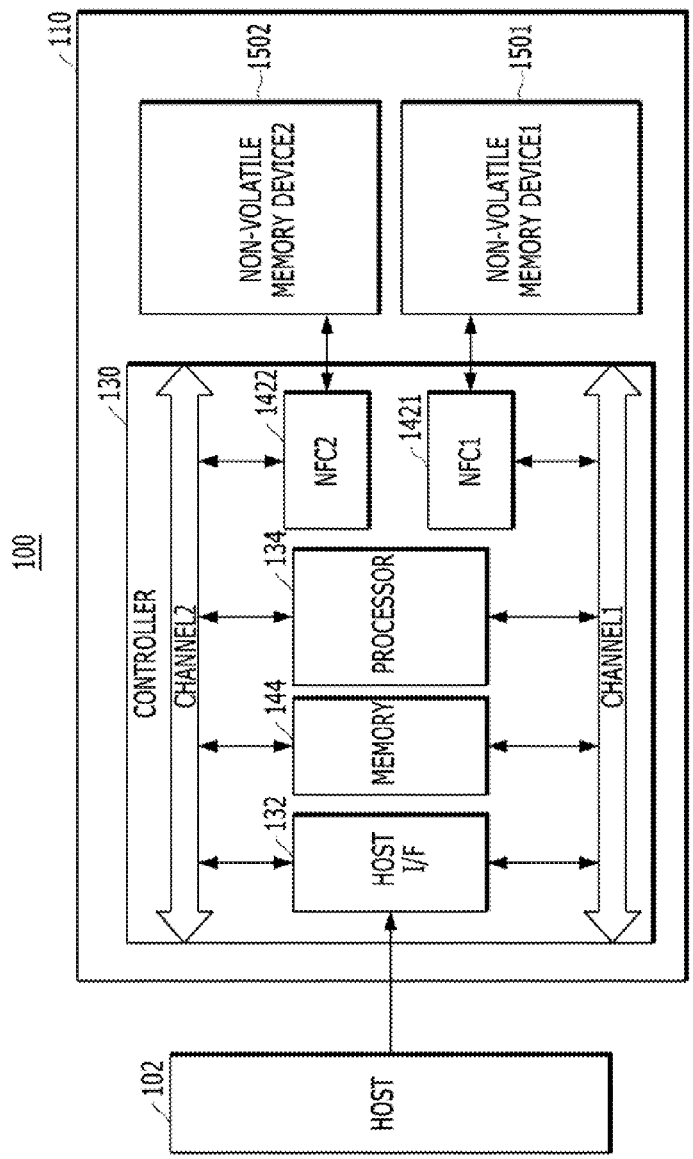
FIG. 12 is a diagram illustrating an example of a data processing system including a plurality of memory devices, according to an embodiment of the invention.

FIG. 12 illustrates a data processing system 100 including a plurality of memory devices 1501 and 1502, according to an embodiment of the invention.

In FIG. 12, only two non-volatile memory devices 1501 and 1502 are shown, however, it is noted that this configuration is only an example.

For example, the data processing system 100 may include a larger number of non-volatile memory devices as the plurality of memory devices. For example, in an embodiment eight non-volatile memory devices, each having a capacity of 128 GB may be included as the plurality of memory devices resulting in a data processing system 100 having a total capacity of 1 TB. Furthermore, it is noted that FIG. 12 does not illustrate the ECC and the power management units 138 and 140 included in the controller 130 of FIG. 1 for convenience of description. Hence, the ECC and the power management units 138 and 140 may be included in the controller 130 of FIG. 12 as well.

More specifically, the data processing system 100 illustrated in FIG. 12 may include a host 102 and a memory system 110. The memory system 110 may include the controller 130 and the plurality of memory devices 1501 and 1502. The controller 130 may include a host interface 132, a memory 144, a processor 134, and first and second memory interfaces 1421 and 1422 as a NAND flash controller (NFC).

The first non-volatile memory device 1501 may be coupled to a first channel CHANNEL1 through the first memory interface 1421. The second non-volatile memory device 1502 may be coupled to a second channel CHANNEL2 through the second memory interface 1422. The host 102 may be coupled to both of the first and second channels CHANNEL1 and CHANNEL2 through a host interface 132.

Inside the controller 130, the processor 134 and the memory 144 may be coupled to the first and second channels CHANNEL1 and CHANNEL2 simultaneously. Thus, the plurality of memory devices 1501 and 1502 may be operated while sharing the processor 134 and the memory 144.

In short, compared to the data processing system 100 of FIG. 1, the data processing system illustrated in FIG. 12 may include one more channel and one more memory device. For convenience of illustration, FIG. 12 illustrates a configuration in which only two channels CHANNEL1 and CHANNEL2 are included corresponding to two memory devices 1501 and 1502. It is noted, however, that any number of channels and memory devices may be included. In an embodiment, a data processing system 100 may be provided, including eight memory devices and eight corresponding channels and channel interfaces. In the following embodiments, the case where two memory devices 1501 and 1502 are included in the data processing system 100 as shown in FIG. 12 will be further described as an example.

Figure 13:
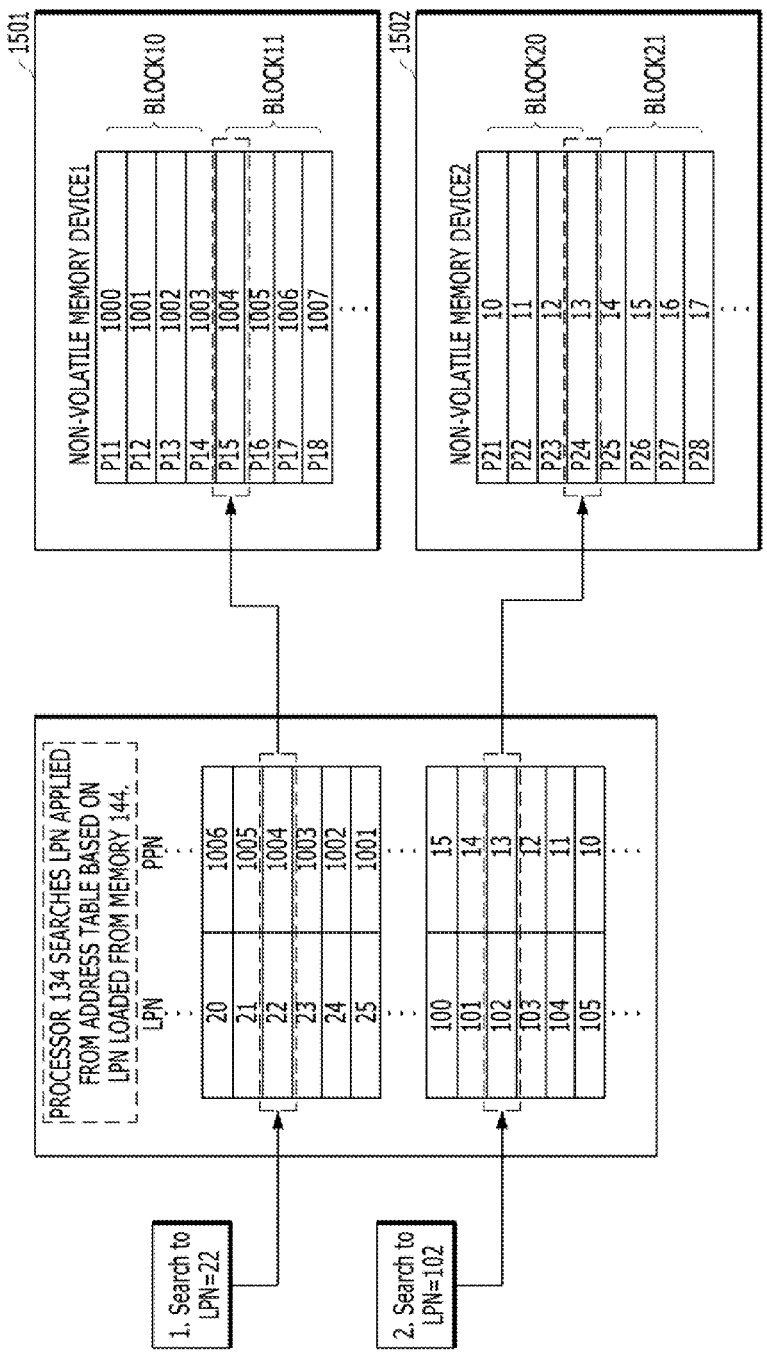
FIG. 13 is a diagram illustrating an address mapping method of the data processing of FIG. 12, according to an embodiment of the invention.

FIG. 13 is a diagram illustrating an address mapping method of the data processing system including the plurality of memory devices illustrated in FIG. 12.

FIG. 13 illustrates a method for mapping a logical address LPN to a physical address PPN in the data processing system 100 including the first and second memory devices 1501 and 1502 of FIG. 12.

The first memory device 1501 may include a plurality of first blocks of which only two blocks namely BLOCK10 and BLOCK11 are shown for convenience of illustration. In this example each of the plurality of first blocks BLOCK10, BLOCK11 may include a plurality of first pages of which only eight pages namely pages P11, P12, P13, P14, P15, P16, P17, P18 are shown for convenience of Illustration. Furthermore, a plurality of physical addresses PPN of which only eight physical addresses are shown for convenience of illustration namely physical addresses 1000, 1001, 1002, 1003, 1004, 1005, 1006, and 1007. The physical addresses 1000, 1001, 1002, 1003, 1004, 1005, 1006, and 1007 may indicate respective first pages P11, P12, P13, P14, P15, P16, P17, and P18 which may be previously set and fixed. The values of the physical addresses PPN 1000, 1001, 1002, 1003, 1004, 1005, 1006, and 1007 need to be known, in order to input/output data to and from the first memory device 1501.

The second memory device 1502 may include a plurality of second blocks of which only two blocks namely blocks BLOCK20 and BLOCK21 are illustrated for convenience of Illustration. In this example, the plurality of second blocks BLOCK20, BLOCK21 may include a plurality of second pages of which only eight pages namely pages P21, P22, P23, P24, P25, P26, P27 and P28 are illustrated for convenience of Illustration. Furthermore, a plurality of physical addresses PPN of which only eight are illustrated namely physical addresses PPN 10, 11, 12, 13, 14, 15, 16 and 17 indicating the respective second pages P21, P22, P23, P24, P25, P26, P27 and P28 which may be previously set and fixed. The values of the physical addresses PPN 10, 11, 12, 13, 14, 15, 16 and 17 indicating the plurality of second pages P21, P22, P23, P24, P25, P26, P27 and P28 may need to be known, in order to input/output data to and from the second memory device 1502.

While each of the first and second memory devices 1501 and 1502 uses the physical addresses PPN, the host 102 may use logical addresses LPN. Thus, an operation of mapping a logical address LPN used in the host 102 to a physical address PPN used in the first and second memory devices 1501 and 1502 may be needed. An address mapping operation may be needed when the first and second memory devices 1501 and 1502 are non-volatile memory devices which perform a data read/write operation on a page basis and a data erase operation on a block basis, whereas the host 102 performs a data read/write/erase operation on a page basis.

Therefore, after an address mapping table illustrated in FIG. 13 is used to change a logical address LPN inputted from the host 102 to a physical address PPN, data may be inputted/outputted to and or from the first and second memory devices 1501 and 1502.

In this example, the address mapping table may use a method of allocating a physical address PPN based on a logical address LPN. That is, when the value of a specific logical address LPN is accessed (written or erased) from the host 102 in a state where all logical addresses LPN which can be set by the host 102 are stored on the basis of the address mapping table, the value of a physical address PPN corresponding to the specific logical address LPN may be updated.

For example, when a logical address having a value of 22 is accessed in order for the host 102 to read data stored in the logical address LPN (Case 1), the data processing system 100 can search a physical address PPN having a value of 1004, connected to the logical address having a value of 22, in the address mapping table. Then, according to the searched physical address PPN having a value of 1004, the data processing system 100 may perform a read operation of accessing the page P15 of the first block BLOCK11 of the first memory device 1501 to output data stored in the page P15 to the host 102.

Similarly, when a logical address LPN having a value of 102 is accessed in order to write data inputted from the host 102 to the logical address LPN (Case 2), the data processing system 100 may search a physical address PPN having a value of 13, connected to the logical address LPN having a value of 102, in the address mapping table. Then, according to the searched physical address PPN having a value of 13, the data processing system 100 may a write operation of accessing the page P24 of the zero-th block BLOCK20 of the second memory device 1502 for storing the data inputted from the host 102 in the page P24. For reference, although the detailed descriptions of the operation are omitted, an operation of connecting the logical address LPN having a value of 102 to the physical address PPN having a value of 13 may be performed before the write operation. Furthermore, the page P24 of the zero-th block BLOCK20 of the second memory device 1502, indicated by the physical address PPN having a value of 13, may be a free page having no data stored therein.

The address mapping table may have a considerably large size because the values of all logical addresses LPN accessible by the host 102 and the values of all physical addresses PPN corresponding to the logical addresses LPN may correspond to each other and stored as a table. Thus, the entire information of the address mapping table may be stored in the first and second memory devices 1501 and 1502, and the processor 134 may load only a part of the address mapping table into the memory 144, and use the loaded part.

For example, suppose that each of the pages P11, P12, P13, P14, P15, P16, P17, P18 and P21, P22, P23, P24, P25, P26, P27, P28 included in the first and second memory devices 1501 and 1502, respectively, may have a capacity of 4 KB ($2^{15}$), and each of the logical addresses LPN and the physical addresses PPN may have a size of 32 bit ($2^{5}$). In this case, when each of the first and second memory devices 1501 and 1502 is set to have a capacity of 128 GB ($2^{40}$) so that the total capacity is set to 256 GB ($2^{41}$), the size of the address mapping table corresponding to each of the first and second memory devices 1501 and 1502 may be set to 128 MB ($2^{30}$). Thus, the total size of the address mapping table may be set to 256 MB ($2^{31}$). Since the address mapping table may have a considerably large size, the entire information of the address mapping table may be stored in the first and second memory devices 1501 and 1502, and the processor 134 may load only a part of the address mapping table into the memory 144 and use the loaded part.

As described with reference to FIG. 12, the first and second memory devices 1501 and 1502 share the processor 134 and the memory 144, and the host 102 may have no way of distinguishing between the first and second memory devices 1501 and 1502. For example, although the two memory devices 1501 and 1502 each having a capacity of 128 GB are clearly distinguished from each other inside the memory system 110, the host 102 only considers that the memory system 110 having a capacity of 256 GB is coupled to the host 102.

Thus, the value of a logical address LPN transmitted to the memory system 110 from the host 102 may not distinguish between the first and second memory devices 1501 and 1502. However, the memory system 110 may distinguish between the first and second memory devices 1501 and 1502, and map the value of a physical address PPN to the value of the logical address LPN transmitted from the host 102.

Since the host 102 cannot distinguish between the first and second memory devices 1501 and 1502 included in the memory system 110, the address mapping table may need to be duplicated and stored in the first and second memory devices 1501 and 1502, for a smooth address mapping operation.

For example, a logical address LPN indicating a physical address PPN corresponding to the first memory device 1501 may be inputted from the host 102, and a logical address LPN indicating a physical address PPN corresponding to the second memory device 1502 may be then inputted. In this example, when the address mapping table stored in the first memory device 1501 stores only the information on the logical address LPN for the physical address PPN corresponding to the first memory device 1501, the logical address LPN indicating the physical address PPN corresponding to the second memory device 1502 cannot be searched in the address mapping table stored in the first memory device 1501. In this case, however, the processor 134 cannot determine whether to additionally load the address mapping table stored in the first memory device 1501 to search the logical address or search the logical address in the address mapping table stored in the second memory device 1502. For this reason, a normal operation cannot be performed. Thus, the address mapping table for storing the information on the logical addresses LPN for the physical addresses PPN corresponding to both of the first and second memory devices 1501 and 1502 may need to be duplicated and stored in the first and second memory devices 1501 and 1502. For example, when the size of the address mapping table including the physical addresses PPN corresponding to the first memory device 1501 and the logical addresses LPN for the physical addresses PPN is set to 128 MB and the size of the address mapping table including the physical addresses PPN corresponding to the second memory device 1502 and the logical addresses LPN for the physical addresses PPN is set to 128 MB, the size of the address mapping table including the physical addresses PPN corresponding to both of the first and second memory devices 1501 and 1502 and the logical addresses LPN for the physical addresses PPN may be set to 256 MB. In this case, the address mapping table having a size of 256 MB may need to be stored in the first memory device 1501, and the address mapping table having a size of 256 MB may also needs to be stored in the second memory device 1502.

In short, in the memory system 110 including the first and second memory devices 1501 and 1502, the address mapping table may need to be duplicated and stored in each of the first and second memory devices 1501 and 1502. In the above-described embodiment, since the first and second memory devices 1501 and 1502 are included in the memory system 110, the address mapping table may be duplicated and stored only in the first and second memory devices 1501 and 1502. However, when the memory system 110 includes eight memory devices, the address mapping table may need to be duplicated and stored in the eight memory devices. For example, when the size of the address mapping table corresponding to each of the eight memory devices is 128 MB, the size of the address mapping table corresponding to all of the eight memory devices may be set to 1 GB, and the address mapping table having a size of 1 GB may be duplicated and stored in each of the eight memory devices.

Figure 14:
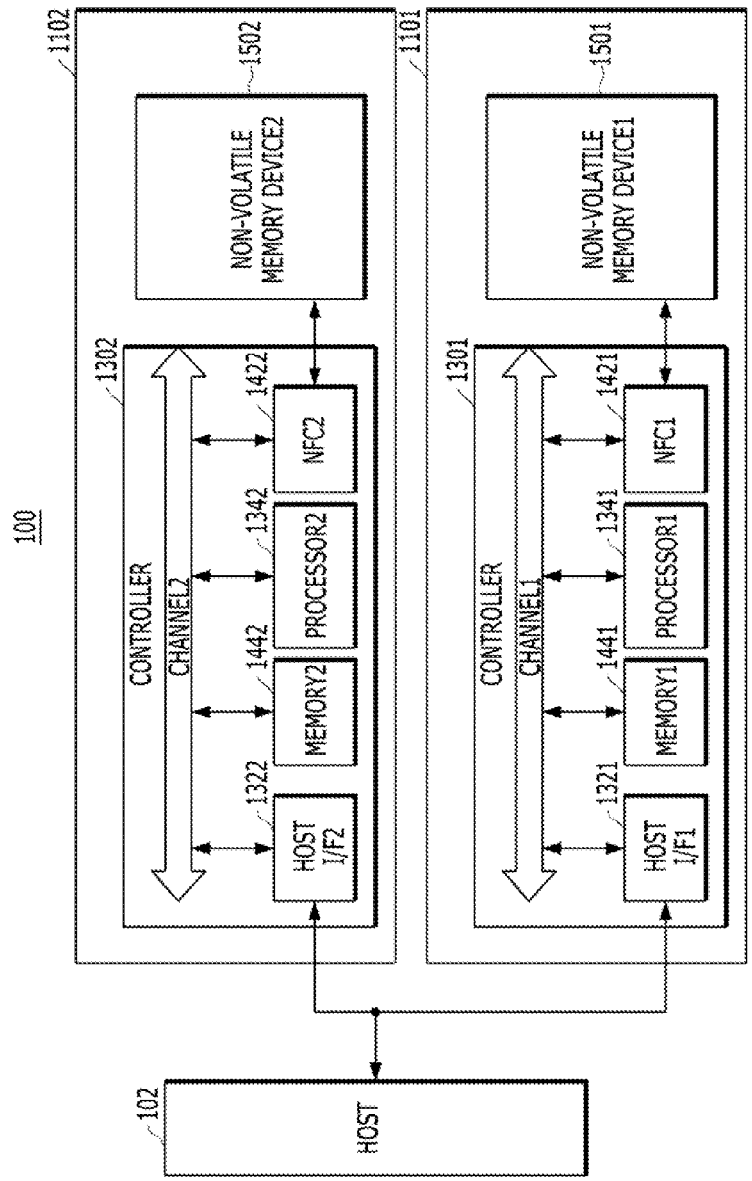
FIG. 14 is a diagram illustrating a data processing system including a plurality of memory devices, according to another embodiment of the invention.

FIG. 14 is a diagram illustrating another example of a data processing system including a plurality of memory devices.

Referring to FIG. 14, two memory systems 1101 and 1102 are included as the plurality of memory systems, but this is only an example. A larger number of memory systems may be included as the plurality of memory systems. For example, when one memory system 1101 includes one memory device having a capacity of 128 GB, eight memory systems may be set to the plurality of memory systems, in order to include eight memory devices. In this case, the data processing system 100 may have a total capacity of 1 TB. Furthermore, FIG. 14 illustrates that the ECC unit 138 and the power management unit 140 included in the controller 130 of FIG. 1 are not included in controllers 1301 and 1302 included in the respective memory systems 1101 and 1102. However, the illustration for the ECC unit 138 and the power management unit 140 is omitted only for convenience of description, and the ECC unit 138 and the power management unit 140 may be included in the controllers 1301 and 1302.

Specifically, the data processing system 100 illustrated in FIG. 14 may include the host 102, the first memory system 1101, and the second memory system 1102. The first memory system 1101 may include the first controller 1301 and a first memory device 1501 as a first non-volatile memory device. The first controller 1301 may include a first host interface 1321, a first memory 1441, a first processor 1341, and a first memory interface 1421 as a first NAND flash controller (NFC1). The second memory system 1102 may include the second controller 1302 and a second memory device 1502 as a second non-volatile memory device. The second controller 1302 may include a second host interface 1322, a second memory 1442, a second processor 1342, and a second memory interface 1422 such as a second NAND flash controller (NFC2).

The first memory device 1501 may be coupled to a first channel CHANNEL1 through the first memory interface 1421.

The second memory device 1502 may be coupled to a second channel CHANNEL2 through the second memory interface 1422.

The host 102 may be coupled to the first channel CHANNEL1 through the first host interface 1321, and coupled to the second channel CHANNEL2 through the second host interface 1322. That is, the host 102 may be coupled to the first and second channels CHANNEL1 and CHANNEL2 simultaneously.

The first processor 1341 and the first memory 1441 may be coupled to the first channel CHANNEL1 and used to control the first memory device 1501.

The second processor 1342 and the second memory 1442 included in the second controller 1302 may be coupled to the second channel CHANNEL2 and used to control the second memory device 1502.

In short, the data processing system 100 illustrated in FIG. 14 may include two memory systems 1101 and 1102 as the memory system 110 illustrated in FIG. 1. In the embodiment of FIG. 14 In this example, the first and second memory systems 1101 and 1102 may be coupled in parallel to the host 102, and receive commands, addresses, and data (not illustrated) in parallel. For convenience of description, FIG. 14 illustrates only two memory systems 1101 and 1102, each memory system including one memory device 1501 and 1502, respectively, so that only two memory devices 1501 and 1502 are included in the data processing system 100. However, it is noted that the invention is not limited in this way and that many other combinations may be employed. For example, in an embodiment, eight memory systems may be included in the data processing system 100, each including a memory device in order to include eight memory devices in the data processing system 100. In the present embodiment, the case in which two memory systems 1101 and 1102 are included in the data processing system 100 will be taken as an example for further description.

FIGS. 15A to 15E are diagrams illustrating an address mapping method of a data processing system including a plurality of memory devices illustrated in FIG. 14.

FIGS. 15A to 15E illustrate a method for mapping a logical address LPN to a physical address PPN in the data processing system 100 including the first and second memory systems 1101 and 1102 having the first and second memory devices 1501 and 1502, respectively, as illustrated in FIG. 14.

First, the first memory device 1501 may include a plurality of first blocks two of which are only illustrated for convenience, namely blocks BLOCK10 and BLOCK11. In this example, the first blocks BLOCK10, and BLOCK11 may include a plurality of first pages eight of which are only illustrated for convenience, namely P11, P12, P13, P14, P15, P16, P17 and P18. The physical addresses PPN of 1000, 1001, 1002, 1003, 1004, 1005, 1006, and 1007 indicating the respective first pages P11, P12, P13, P14, P15, P16, P17, and P18 of the first memory device 1501 may be previously set and fixed. That is, the values of the physical addresses PPN indicating the plurality of first pages P11, P12, P13, P14, P15, P16, P17, and P18 may need to be known, in order to input/output data to and or from the first memory device 1501.

The second memory device 1502 may include a plurality of second blocks two of which are only illustrated for convenience, namely blocks BLOCK20, and BLOCK21. In this example, the second blocks BLOCK20 and BLOCK21 may include a plurality of second pages eight of which are only illustrated for convenience, namely pages P21, P22, P23, P24, P25, P26, P27, and P28. The physical addresses PPN of 10, 11, 12, 13, 14, 15, 16, and 17 indicating the respective second pages P21, P22, P23, P24, P25, P26, P27, and P28, the second memory device 1502 may be previously set and fixed. That is, the values of the physical addresses PPN indicating the plurality of second pages P21, P22, P23, P24, P25, P26, P27, and P28 may need to be known, in order to input/output data to and or from the second memory device 1502.

While each of the first and second memory devices 1501 and 1502 uses the physical addresses PPN, the host 102 may use logical addresses LPN. Thus, an operation of mapping a logical address LPN used in the host 102 to a physical address PPN used in the first and second memory devices 1501 and 1502 may be needed. The reason why such an address mapping operation may be needed is that the first and second memory devices 1501 and 1502 are non-volatile memory devices which perform a data read/write operation on a page basis but perform a data erase operation on a block basis, but the host 102 performs a data read/write/erase operation on a page basis.

Thus, as illustrated in FIGS. 15A to 15E, a preset operation may be performed through the first and second processors 1341 and 1342, and an address mapping table for updating the value of a logical address LPN based on a physical address PPN may be used to input/output data to and or from the first and second memory devices 1501 and 1502.

Specifically, the first memory system 1101 may store the values of a plurality of first physical addresses PPN1 of which only eight are illustrated for convenience, for physically indicating the respective first pages P11, P12, P13, P14, P15, P16, P17 and P18 included in the first memory device 1501 as a first table TB1. According to whether the value of a physical address PPN generated by performing a preset operation on a logical address LPN applied from the host 102 may exist in the first table TB1, the first memory system 1101 may determine whether to perform a preset operation corresponding to a command (not illustrated) applied from the host 102.

In this example, the first memory device 1501 may store the first table TB1, and the first processor 1341 may load a part of the first table TB1 into the first memory 1441 and use the loaded part.

The first controller 1301 may perform a preset operation on the logical address LPN applied from the host 102, and generate a physical address PPN. In this example, the first controller 1301 may check whether the generated physical address PPN may exist in the first table TB1 stored in the first memory device 1501. When it is checked that the physical address PPN may exist, the first controller 1301 may perform a preset operation corresponding to a command (not illustrated) applied from the host 102. On the other hand, when it is checked that the physical address PPN not exist, the first controller 1301 may ignore the command applied from the host 102, and perform no operation.

Specifically, the second memory system 1102 may store the values of a plurality of second physical addresses PPN1 for physically indicating the respective second pages P21, P22, P23, P24, P25, P26, P27, P28, . . . included in the second memory device 1502 as a second table TB2. According to whether the value of a physical address PPN generated by performing a preset operation on a logical address LPN applied from the host 102 may exist in the second table TB2, the second memory system 1102 may determine whether to perform a preset operation corresponding to a command (not illustrated) applied from the host 102.

In this example, the second memory device 1502 may store the second table TB2, and the second processor 1342 may load a part of the second table TB2 into the second memory 1442 and use the loaded part.

The second controller 1302 may perform the preset operation on the logical address LPN applied from the host 102, and generate the physical address PPN. In this example, the second controller 1302 may check whether the generated physical address PPN may exist in the second table TB2 stored in the second memory device 1502. When it is checked that the physical address PPN may exist, the second controller 1302 may perform the preset operation corresponding to a command (not illustrated) applied from the host 102. On the other hand, when it is checked that the physical address PPN does not exist, the second controller 1302 may ignore the command applied from the host 102, and perform no operation.

As described above, the first memory system 1101 may perform the preset operation on the logical address LPN applied from the host 102, and generate the physical address PPN. Similarly, the second memory system 1102 may perform the preset operation on the logical address LPN applied from the host 102, and generate the physical address PPN.

In this example, the preset operation on the logical address performed in the first memory system 1101 is identical to the preset operation performed on the logical address in the second memory system 1102. Furthermore, the point of time that the preset operation is performed on the logical address in the first memory system 1101 is equal to the point of time that the preset operation is performed on the logical address in the second memory system 1102. This is because the first and second memory systems 1101 and 1102 are coupled in parallel to the host 102 and receive the logical addresses LPN simultaneously, as illustrated in FIG. 14.

In an embodiment, the preset operation may include a hash operation for selecting any one physical address PPN among the plurality of the first and second physical addresses PPN1 and PPN2 in response to the respective logical addresses LPN applied from the host 102. In this example, the number of logical addresses LPN applied from the host 102 may correspond to the sum of the number of the first and second physical addresses PPN1 and PPN2.

In another embodiment, the preset operation may correspond to a binary search operation for selecting any one physical address PPN among the plurality of the first and second physical addresses PPN1 and PPN2 in response to the respective logical addresses LPN applied from the host 102. In this example, the number of logical addresses LPN applied from the host 102 may correspond to the sum of the number of the first and the second physical addresses PPN1 and PPN2.

As described above, a preset operation may calculate and generate a physical address PPN through a mathematical operation, in response to an input logical address LPN. Thus, any suitable operations may be applied as long as the operations can calculate and generate a physical address PPN through a mathematical operation in response to an input logical address LPN. For reference, since hash and binary search operations are widely known, detailed descriptions thereof are omitted herein.

Figure 15B:
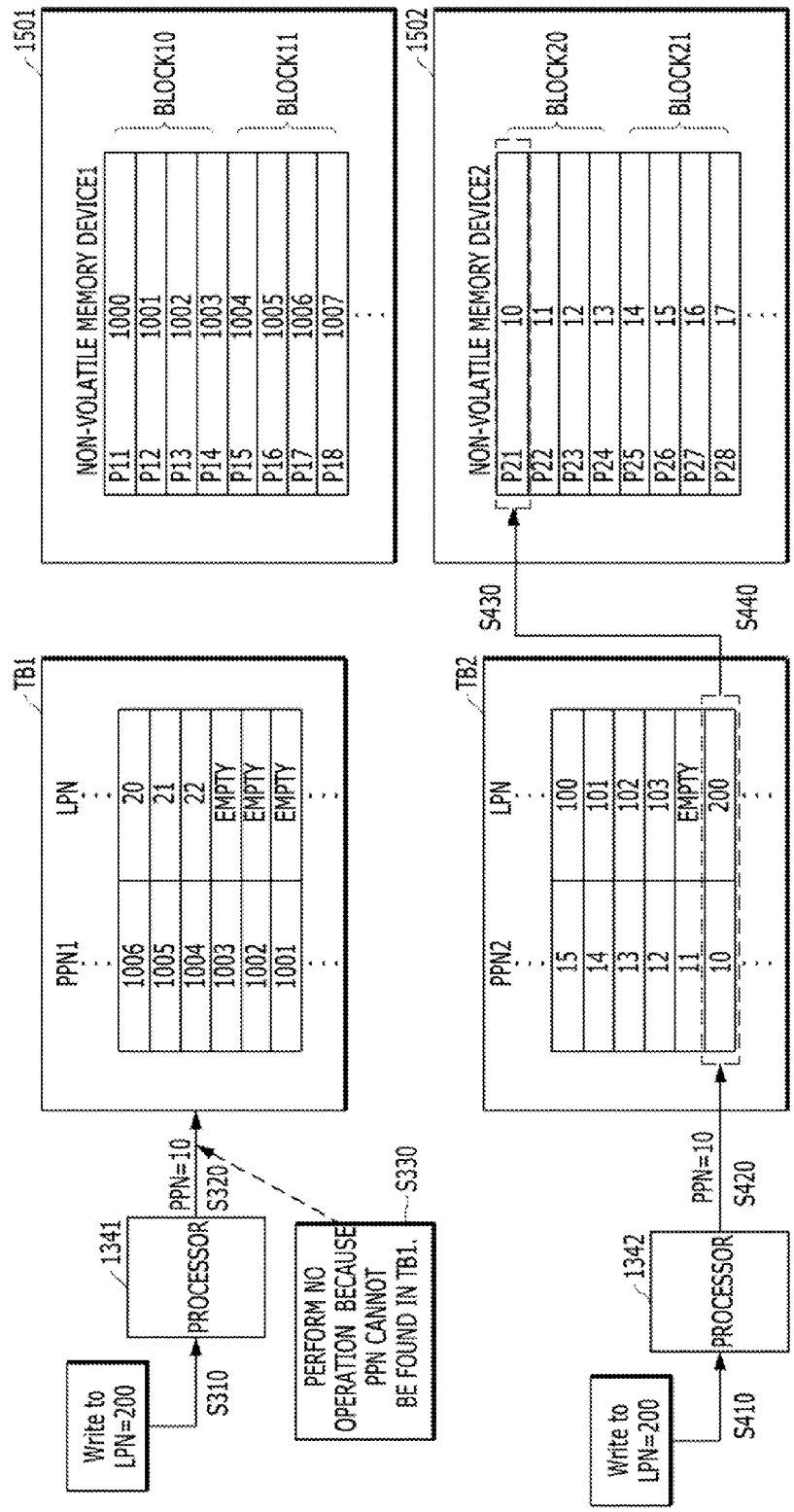

FIGS. 15A and 15B illustrate a first embodiment of the first and second tables TB1 and TB2. Referring to FIGS. 15A and 15B, the first table TB1 may store a plurality of first physical addresses PPN1 of which only eight are shown for convenience of illustration, indicating a plurality of respective first pages of which only eight are illustrated for convenience namely pages P11, P12, P13, P14, P15, P16, P17 and P18 included in the first memory device 1501. In the first table TB1, logical addresses LPN for generating the respective first physical addresses PPN1 through a preset operation may be stored in a state where the logical addresses LPN may correspond to the respective first physical addresses PPN1.

Similarly, the second table TB2 may store a plurality of second physical addresses PPN2 of which only eight are shown for convenience of Illustration, indicating a plurality of respective second pages of which only eight are illustrated for convenience namely pages P21, P22, P23, P24, P25, P26, P27 and P28 included in the second memory device 1502. In the second table TB2, logical addresses LPN for generating the respective second physical addresses PPN2 through the preset operation may be stored in a state where the logical addresses LPN may correspond to the respective second physical addresses PPN2.

Referring to FIG. 15A, a preset operation corresponding to a command (not illustrated) applied from the host 102 may be a read operation.

When a logical address LPN having a value of 22, inputted from the host 102, may be applied in parallel to the first and second memory systems 1101 and 1102 (S110, S210), the first and second processors 1341 and 1342 may generate a physical address PPN having a value of 1004 by performing the preset operation for the logical address LPN having the value of 22 simultaneously (S120, S220). The first and second processors 1341 and 1342 may search for the physical address PPN having a value of 1004 in the first and second tables TB1 and TB2, respectively, and check whether a value coinciding with the physical address PPN may exist in the first and or the second tables TB1 and TB2.

According to the check result, the value of 1004 may exist in the plurality of first physical addresses PPN1 included in the first table TB1 (S130). Thus, the first processor 1341 may recheck whether the logical address LPN corresponding to the value of 1004 among the plurality of first physical addresses PPN1 may have the same value as the logical address LPN applied from the host 102 (S140). In this example, since the value of 1004 does not exist in the plurality of second physical addresses PPN2 included in the second table TB2, the second memory system 1102 may not perform any operation (S230).

According to the recheck result, the value of the logical address LPN corresponding to the value of 1004 among the plurality of first physical addresses PPN1 may be 22 (S240), which indicates that the logical address LPN may have the same value as the logical address LPN applied from the host 102. Thus, according to the first physical address PPN1 having a value of 1004, the first memory system 1101 may perform a read operation of accessing page P15 of the first block BLOCK11 of the first memory device 1501 to output data stored in page P15 to the host 102.

Although not illustrated, the value of the logical address LPN corresponding to the value of 1004 among the plurality of first physical addresses PPN1 may not be 22 indicating that the read operation is not normal due to an error occurring in the preset operation. Thus, instead of reading data, a read error may be generated and transmitted to the host 102.

FIG. 15A illustrates that some physical addresses PPN1 namely physical addresses PPN1 of 1004, 1005, and 1006 among the first physical addresses PPN1 stored in the first table TB1 may correspond to respective logical addresses LPN of 22, 21, and 20, while physical addresses PPN1 of 1001, 1002, and 1003 may not correspond to any logical addresses LPN (EMPTY). Furthermore, FIG. 15A illustrates that some physical addresses PPN2 namely physical addresses PPN2 of 12, 13, 14, and 15 of among the second physical addresses PPN2 stored in the second table TB2 may correspond to logical addresses LPN of 103, 102, 101, and 100, while physical addresses PPN2 of 10 and 11 may not correspond to logical addresses LPN (EMPTY).

When the values of logical addresses LPN are empty in the first and second tables TB1 and TB2, it may indicate that data have never been written through the logical addresses LPN indicating the corresponding physical addresses PPN from the host 102. That is, when the values of the logical addresses LPN are empty in the first and second tables TB1 and TB2, the pages indicated by the corresponding physical addresses PPN1 and PPN2 may be considered as free regions.

For example, when no data are written in the first and second memory systems 1101 and 1102, the plurality of first pages P11, P12, P13, P14, P15, P16, P17, P18, . . . and the plurality of second pages P21, P22, P23, P24, P25, P26, P27, P28, . . . may be free regions. Thus, in this case, only the first and second physical addresses PPN1 and PPN2 may be stored in the first and second tables TB1 and TB2, and no logical addresses LPN may be stored in the first and second tables TB1 and TB2.

Referring to FIG. 15B, a preset operation corresponding to a command (not illustrated) applied from the host 102 may be a write operation. In particular, when the first and second tables TB1 and TB2 are configured as illustrated in FIG. 15A, the write operation may be performed to change the first and second tables TB1 and TB2 as illustrated, for example, in FIG. 15B.

For example, a logical address LPN having a value of 200 may be received from the host 102, and may be applied in parallel to the first and second memory systems 1101 and 1102 (S310, S410). Then, the first and second processors 1341 and 1342 may generate a physical address PPN having a value of 10 by performing a preset operation for the logical address LPN having the value of 200 simultaneously (S320, S420). The first and second processors 1341 and 1342 may search for the physical address PPN having a value of 10 in the first and second tables TB1 and TB2, and check whether a value coinciding with the physical address PPN may exist in the first and second tables TB1 and TB2.

According to the embodiment of FIG. 15B, the search result shows that the value of 10 may exist in the plurality of second physical addresses PPN1 included in the second table TB2. Thus, the second processor 1342 may then check whether the value of the logical address corresponding to the value of 10 among the plurality of second physical addresses PPN2 is empty. In this example, since the value of 10 does not exist in the plurality of first physical addresses PPN1 included in the first table TB1, the first memory system 1101 may not perform an operation (S330).

According to the check result, the value of the logical address LPN corresponding to the value of 10 among the plurality of second physical addresses PPN2 is empty in the state of FIG. 15A. Thus, the value 200 of the logical address LPN applied from the host 102 may be corresponding to the value of 10 among the plurality second physical addresses PPN2 and then stored as illustrated in FIG. 15B (S430). Then, according to the second physical address PPN2 having a value of 10, the second memory system 1102 may perform a write operation of accessing the page P21 of the zero-th block BLOCK20 of the second memory device 1502 for storing the data inputted from the host 102 into the page P21 (S440).

On the other hand, when the value of the logical address LPN corresponding to the value of 10 among the plurality of second physical addresses PPN2 is not empty, it may indicate that specific data are already stored in the page P21 of the zero-th block BLOCK20 of the second memory device 1502 indicated by the second physical address PPN2 having a value of 10 and the value of the data may need to be updated. Thus, when the value of the logical address LPN corresponding to the value of 10 among the plurality of second physical addresses PPN2 is not empty, the data stored in the page P21 of the zero-th block BLOCK20 of the second memory device 1502 indicated by the second physical address PPN2 having a value of 10 may be changed to an invalid state. Then, the information may be transmitted to the host 102 so that the data applied from the host 102 are stored in another physical region.

Figure 15C:
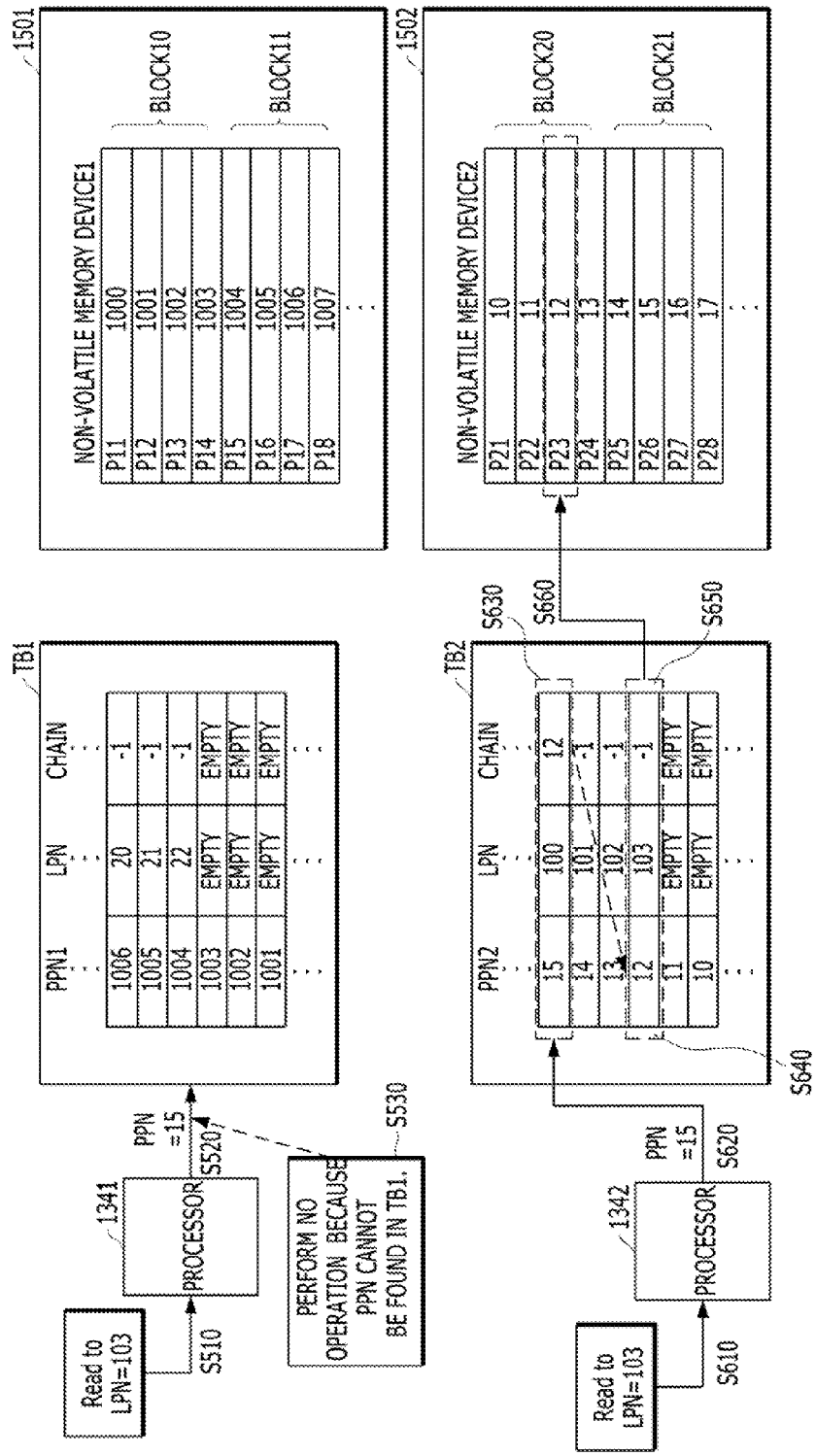
Figure 15D:
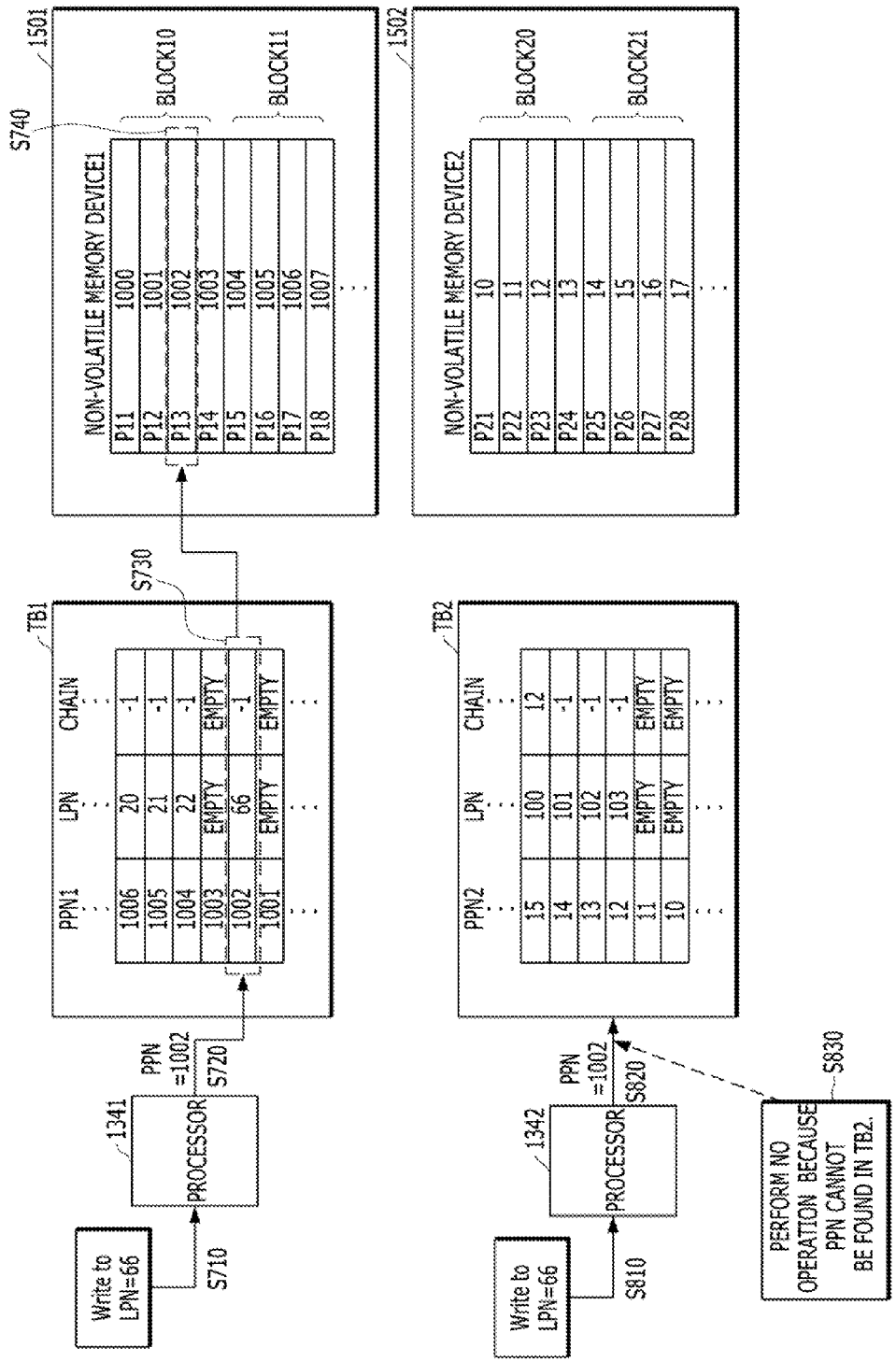
Figure 15E:
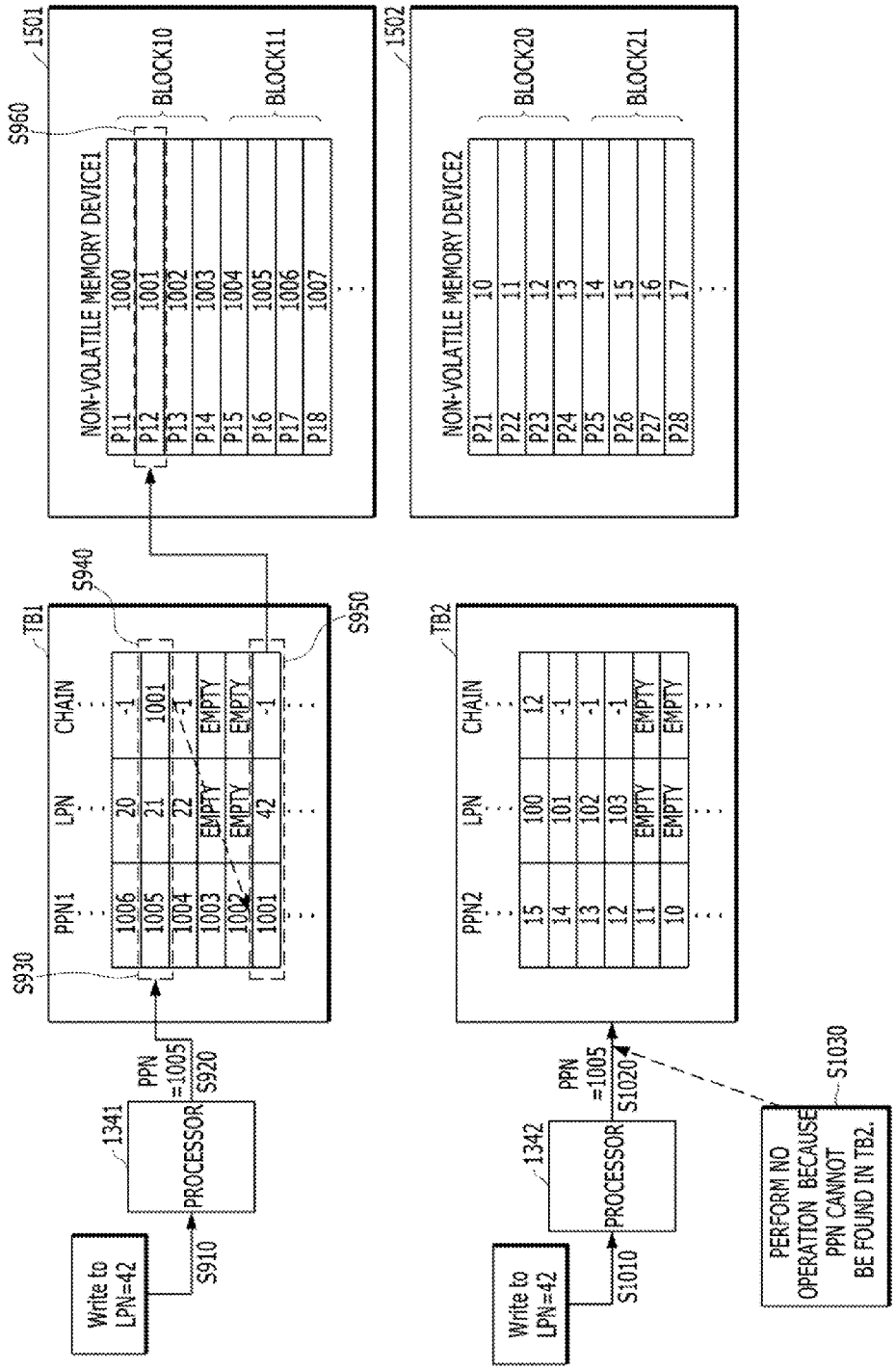

FIGS. 15C to 15E illustrate a second embodiment of the first and second tables TB1 and TB2.

Referring to FIGS. 15C to 15E, the first table TB1 may store a plurality of physical addresses PPN1 indicating a plurality of respective first pages P11, P12, P13, P14, P15, P16, P17, P18, . . . included in the first memory device 1501. Furthermore, the first table TB1 may store the values of logical addresses LPN for generating the respective first physical addresses PPN1 through a preset operation in a state where the logical addresses LPN may correspond to the respective first physical addresses PPN1. Furthermore, the first table TB1 may store the values of duplication indication information CHAIN in a state where the values of the duplication indication information CHAIN may correspond to the respective first physical addresses PPN1, the duplication indication information CHAIN indicating whether the logical addresses LPN connected to the respective first physical addresses PPN1 are duplicated.

Similarly, the second table TB2 may store a plurality of second physical addresses PPN2 indicating the respective second pages P21, P22, P23, P24, P25, P26, P27, P28, . . . included in the second memory device 1502. Furthermore, the second table TB2 may store the values of logical addresses LPN for generating the respective second physical addresses PPN2 through a preset operation in a state where the logical addresses LPN may correspond to the respective second physical addresses PPN2. Furthermore, the second table TB2 may store the values of duplication indication information CHAIN in a state where the values of the duplication indication information CHAIN may correspond to the respective second physical addresses PPN2, the duplication indication information CHAIN indicating whether the logical addresses LPN connected to the respective second physical addresses PPN2 are duplicated.

Referring to FIG. 15C, a preset operation corresponding to a command (not illustrated) applied from the host 102 may be a read operation.

For example, a logical address LPN having a value of 103 may be received from the host 102, and may be applied in parallel to the first and second memory systems 1101 and 1102 (S510, S610). Then, the first and second processors 1341 and 1342 may generate a physical address PPN having a value of 15 by performing the preset operation for the logical address LPN having the value of 103, simultaneously (S520, S620). The first and second processors 1341 and 1342 may search for the physical address PPN having a value of 15 in the first and second tables TB1 and TB2, and check whether a value coinciding with the physical address PPN may exist in the first and second tables TB1 and TB2.

According to the check result, the value of 15 may exist in the plurality of second physical addresses PPN2 included in the second table TB2. Thus, the second processor 1342 may check whether the value of the duplication indication information CHAIN corresponding to the value of 15 among the plurality of second physical addresses PPN2 may have the initial value of −1 (S630). In this example, since the value of 15 does not exist in the plurality of first physical addresses PPN1 included in the first table TB1, the first memory system 1101 may not perform an operation (S530).

According to the check result, the value of the duplication indication information CHAIN corresponding to the value of 15 among the plurality of second physical addresses PPN2 is 12 (S630), which indicates that the value of the duplication indication information CHAIN is not the initial value of −1. Thus, the second processor 1342 may select a physical address PPN having a value of 12 among the plurality of physical addresses PPN2 (S640), the physical address PPN having the same value as the duplication indication information CHAIN connected to the second physical address PPN2 having a value of 15, and recheck whether the duplication indication information CHAIN connected to the selected second physical address PPN2 having the value of 12 may have the initial value of −1 (S650).

According to the recheck result, the value of the duplication indication information CHAIN corresponding to the value of 12 among the plurality of second physical addresses PPN2 is −1 (S650), which indicates that the duplication indication information CHAIN may have the initial value of −1. Thus, the second processor 1342 may recheck whether the logical address LPN corresponding to the value of 12 among the plurality of second physical addresses PPN2 may have the same value as the logical address LPN applied from the host 102.

According to the recheck result, the value of the logical address LPN corresponding to the value of 12 among the plurality of second physical addresses PPN2 may be 103, which indicates that the logical address LPN may have the same value as the logical address LPN applied from the host 102. Thus, according to the second physical address PPN2 having the value of 12, the second memory system 1102 may perform a read operation of accessing the page P23 of the zero-th block BLOCK20 of the second memory device 1502 to output data stored in the page P23 to the host 102 (S660).

Although not illustrated, when the value of the logical address LPN may not be 103 even though the value of the duplication indication information CHAIN corresponding to the value of 15 among the plurality of second physical addresses PPN2 may be −1, it may indicate that the read operation is not normal due to an error occurring in the preset operation. Thus, instead of reading data, a read error may be generated and transmitted to the host 102.

Although not illustrated, when the value of the duplication indication information CHAIN corresponding to the value of 12 among the plurality of second physical addresses PPN2 may not be −1, the second memory system 1102 may repeat the operation of selecting a physical address PPN having the same value as the duplication indication information CHAIN among the plurality of second physical addresses PPN2 and checking the value of the duplication indication information CHAIN connected to the selected second physical address PPN2. The operation may be repeated until the duplication indication information CHAIN connected to the selected second physical address PPN2 may have the initial value of −1 and an actual read operation is performed.

FIG. 15C illustrates that some physical addresses PPN1 of 1004, 1005, and 1006 among the first physical addresses PPN1 stored in the first table TB1 may correspond to logical addresses LPN of 22, 21, and 20 and duplication indication information of −1, −1, and −1, respectively, whereas the physical addresses of 1001, 1002, and 1003 may not correspond to logical addresses LPN and duplication indication information CHAIN (i.e., EMPTY). FIG. 15C illustrates that some physical addresses PPN2 of 12, 13, 14, and 15 among the second physical addresses PPN2 stored in the second table TB2 may correspond to logical addresses LPN of 103, 102, 101, and 100 and duplication indication information CHAIN of −1, −1, −1, and 12, respectively, whereas the physical addresses of 10 and 11 may not correspond to logical addresses LPN and duplication indication information CHAIN (i.e., EMPTY).

When the values of the logical addresses LPN and the duplication indication information CHAIN are empty in the first and second tables TB1 and TB2, it may indicate that data have never been written through the logical addresses LPN indicating the corresponding physical addresses PPN from the host 102. That is, when the values of the logical addresses LPN and the duplication indication information CHAIN are empty in the first and second tables TB1 and TB2, the pages indicated by the corresponding physical addresses PPN1 and PPN2 may be considered as free regions.

For example, when no data are written in the first and second memory systems 1101 and 1102, the plurality of first pages P11, P12, P13, P14, P15, P16, P17, P18, . . . and the plurality of second pages P21, P22, P23, P24, P25, P26, P27, P28, . . . may be free regions. Thus, only the first and second physical addresses PPN1 and PPN2 may be stored in the first and second tables TB1 and TB2, whereas logical addresses and duplication indication information CHAIN may not be stored therein.

Referring to FIGS. 15D and 15E, a preset operation corresponding to a command (not illustrated) applied from the host 102 may be a write operation. In particular, when the first and second tables TB1 and TB2 are configured as illustrated in FIG. 15C, a write operation may be performed to change the first and second tables TB1 and TB2 as illustrated, for example, in FIG. 15D or 15E.

Referring to FIG. 15D, a logical address LPN having a value of 66 may be applied in parallel to the first and second memory systems 1101 and 1102 (S710, S810), the first and second processors 1341 and 1342 may then generate a physical address PPN having a value of 1002 by performing a preset operation for the logical address LPN having the value of 66 simultaneously (S720, S820). The first and second processors 1341 and 1342 may search for the physical address PPN having a value of 1002 in the first and second tables TB1 and TB2, and check whether a value coinciding with the physical address PPN may exist in the first and second tables TB1 and TB2.

According to the search result, the value of 1002 may exist in the plurality of first physical addresses PPN1 included in the first table TB1, as shown in the embodiment of FIG. 15D. Hence, the first processor 1341 may then check whether the value of the logical address LPN corresponding to the value of 1002 among the plurality of first physical addresses PPN1 may be empty (S730). In this example, since the value of 1002 does not exist in the plurality of second physical addresses PPN2 included in the second table TB2, the second memory system 1102 may not perform an operation (S830).

According to the check result, the value of the logical address LPN corresponding to the value of 1002 among the plurality of first physical addresses PPN1 may have been empty as illustrated in FIG. 15C. Thus, as illustrated in FIG. 15D, the first memory system 1101 may store the logical address LPN having a value of 66 applied from the host 102 and the duplication indication information CHAIN having the initial value of −1 in a state where the logical address LPN and the duplication information CHAIN correspond to the value of 1002 among the plurality first physical addresses PPN1. According to the first physical address PPN1 having a value of 1002, the first memory system 1101 may perform a write operation of accessing the page P13 of the zero-th block BLOCK10 of the first memory device 1501 for storing the data inputted from the host 102 into the page P13 (S740).

Referring to FIG. 15E, a logical address LPN may be inputted from the host 102 having a value of 42 and may be applied in parallel to the first and second memory systems 1101 and 1102 (S910, S1010). Then, the first and second processors 1341 and 1342 may generate a physical address PPN having a value of 1005 by performing a preset operation for the logical address LPN having the value of 42 simultaneously (S920, S1020). The first and second processors 1341 and 1342 may search for the physical address PPN having a value of 1005 in the first and second tables TB1 and TB2, and check whether a value coinciding with the physical address PPN may exist in the first and second tables TB1 and TB2.

According to the search result, the value of 1005 may exist in the plurality of first physical addresses PPN1 included in the first table TB1. Thus, the first processor 1341 may check whether the value of the logical address LPN corresponding to the value of 1005 among the plurality of first physical addresses PPN1 is empty (S930). In this example, since the value of 1005 does not exist in the plurality of second physical addresses PPN2 included in the second table TB2, the second memory system 1102 may not perform any operation (S1030).

The check result may indicate that the value of the logical address LPN corresponding to the value of 1005 among the plurality of first physical addresses PPN1 is 21 In the state of FIG. 15C (S930). This may indicate that specific data are already stored in the page P16 of the first block BLOCK11 of the first memory device 1501, indicated by the first physical address PPN1 of 1005, and the value thereof may need to be updated. Thus, the data stored in the page P16 of the first block BLOCK11 of the first memory device 1501, indicated by the first physical address PPN1 having a value of 1005, may be changed to invalid data.

Then, the first memory system 1101 may select any one first physical address PPN1 having no logical address LPN connected thereto, among the plurality of first physical addresses PPN1. In this example, since the first physical address PPN1 having a value of 1001 may have no logical address LPN connected thereto (EMPTY), the first physical address PPN1 may be selected as illustrated in FIG. 15E (S940). The value 1001 of the selected first physical address PPN1 may be stored as the duplication indication information CHAIN of the first physical address PPN1 having a value of 1005, which is determined for storing invalid data. That is, the value of 1001 may be stored as the value of the duplication indication information CHAIN of the first physical address PPN1 having a value of 1005.

Furthermore, the first memory system 1101 may store the logical address LPN having a value of 42 applied from the host 102 and the duplication indication information CHAIN having the initial value of −1 In a state where the logical address LPN and duplication indication information CHAIN may correspond to the first physical address PPN1 having a value of 1001 (S950).

Then, according to the first physical address PPN1 having a value of 1001, the first memory system 1101 may perform a write operation of accessing the page P12 of the zero-th block BLOCK10 of the first memory device 1501 for storing the data received from the host 102 into the page P12 (S960).

In the data processing system 100 including the first and second memory devices 1501 and 1502, which is described with reference to FIGS. 14 and 15A to 15E, the host 102 may not distinguish between the first and second memory devices 1501 and 1502, either.

However, since the address mapping table is not configured based on logical addresses LPN received from the host 102 but the address mapping table is configured based on physical addresses PPN and a logical address LPN applied from the host 102 is translated to a physical address PPN through a preset operation, a smooth address mapping operation may be performed even though the address mapping table is not duplicated and stored.

Specifically, in the present embodiment, the first memory system 1101 may include only the first table TB1 based on the first physical addresses PPN1 indicating the plurality of first pages P11, P12, P13, P14, P15, P16, P17, P18, . . . included in the first memory device 1501, and the second memory system 1102 may include only the second table TB2 based on the second physical addresses PPN2 indicating the plurality of first pages P11, P12, P13, P14, P15, P16, P17, P18, . . . included in the second memory device 1502.

In this state, a logical address LPN inputted from the host 102 may be translated to a physical address PPN through a preset operation, and the physical address PPN may be directly searched in the first and second tables TB1 and TB2 simultaneously.

In this example, the first processor 1341 and the first memory 1441 may independently control only the operation of the first memory device 1501, and the second processor 1342 and the second memory 1442 may independently control only the operation of the second memory device 1502.

Therefore, each of the first and second processors 1341 and 1342 may perform a preset operation on the logical address LPN applied from the host 102, and generate the physical address PPN in parallel. Furthermore, the physical address generated through the preset operation may be simultaneously searched in the first and second tables TB1 and TB2. This may indicate that the operation of determining in which table of the first and second tables TB1 and TB2 the physical address PPN generated through the preset operation may exist as the research result can be easily performed.

Thus, although the first memory system 1101 includes only the first table TB1 and the second memory system 1102 includes only the second table TB2, the address mapping operation may be smoothly performed.

For example, suppose that the size of the first table TB1 corresponding to the first memory device 1501 having a size of 128 GB is 128 MB, and the size of the second table TB2 corresponding to the second memory device 1502 having a size of 128 GB is 128 MB. In this case, although only the first table TB1 having a size of 128 MB is stored in the first memory device 1501 and only the second table TB2 having a size of 128 MB is stored in the second memory device 1502, the address mapping operation may be smoothly performed.

Furthermore, even when the data processing system 100 includes a larger number of memory devices in addition to the first and second memory devices 1501 and 1502, for example, even when the data processing system 100 includes eight memory devices, the address mapping operation can be smoothly performed in case where each of the eight memory devices includes the corresponding address mapping table.

According to the embodiments of the present invention, the respective memory systems included in the data processing system may set the address tables based on the physical addresses indicating the respective memory systems, so that the address mapping tables are distributed and stored in the respective memory systems. Furthermore, the respective memory systems may translate logical addresses applied from the host into physical addresses through parallel operations, and then search the translated physical addresses in the address tables distributed in the respective memory systems.

Thus, the area occupied by the address tables in the respective memory systems can be minimized.

Although various embodiments have been described for illustrative purposes, it will be apparent to those skilled in the art that various changes and modifications may be made without departing from the spirit and scope of the invention as defined in the following claims.

What is claimed is:

1. A data processing system comprising:
   at least two memory systems including first and second memory systems to which a logical address and a command are applied in parallel from a host,
   wherein the first memory system including a first controller stores a plurality of first physical addresses for physically indicating a plurality of first pages included in a first non-volatile memory device as a first table, and the first controller determines whether to perform a preset operation corresponding to the applied command according to whether a physical address generated by performing a preset operation on the applied logical address exists in the first table, and
   the second memory system including a second controller stores a plurality of second physical addresses for physically indicating a plurality of second pages included in a second non-volatile memory device as a second table, and the second controller determines whether to perform the preset operation corresponding to the applied command according to whether a physical address generated by performing the preset operation on the applied logical address exists in the second table,
   wherein the first table stores the logical addresses for generating the plurality of first physical addresses through the preset operation in a state where the logical addresses correspond to the respective first physical addresses,
   wherein when the preset operation corresponding to the applied command is a write operation, the first controller of the first memory system compares the physical address generated by performing the preset operation on the applied logical address to the plurality of first physical addresses, and checks whether there exists a first physical address coinciding with the physical address,
   when the first physical address coinciding with the physical address may exist, the first controller of the first memory system rechecks whether the logical address connected to the corresponding first physical address exists,
   when the logical address connected to the corresponding first physical address does not exist, the first controller of the first memory system stores the applied logical address in the first table in a state where the applied logical address is connected to the corresponding first physical address, and
   when the logical address connected to the corresponding first physical address exists, the first controller of the first memory system changes a first page corresponding to the corresponding first physical address among the plurality of first pages to an invalid state, and transmits the information to the host.

2. The data processing system of claim 1, wherein the first memory system comprises:
   the first non-volatile memory device comprising the plurality of first pages, and stores the first table; and
   the first controller generates a physical address by performing the preset operation on the applied logical address, checking whether the generated physical address exists in the first table stored in the first non-volatile memory device, and determining whether to perform the predetermined operation corresponding to the command according to the check result.

3. The data processing system of claim 2, wherein the second memory system comprises:
   the second non-volatile memory device comprising the plurality of second pages, and suitable for storing the second table; and
   the second controller generates a physical address by performing the preset operation on the applied logical address, checking whether the generated physical address exists in the second table stored in the second non-volatile memory device, and determining whether to perform the predetermined operation corresponding to the command according the check result.

4. The data processing system of claim 1, wherein each of the first and second memory systems generate the physical address by performing the preset operation on the applied logical address in simultaneously.

5. The data processing system of claim 1, wherein when the predetermined operation corresponding to the applied command is a read operation, the first memory system compares the physical address generated by performing the preset operation on the applied logical address to the plurality of first physical addresses, and checks whether there exists a first physical address coinciding with the physical address,
   when the first physical address coinciding with the physical address exists, the first memory system rechecks whether the logical address connected to the corresponding first physical address coincides with the applied logical address, and
   when the logical address coincides with the applied logical address, the first memory system performs the read operation from the first non-volatile memory device using the corresponding first physical address.

6. The data processing system of claim 1, wherein the second table stores the logical addresses for generating the plurality of second physical addresses through the preset operation in a state where the logical addresses correspond to the respective second physical addresses.

7. The data processing system of claim 6, wherein when the preset operation corresponding to the applied command is a write operation, the second memory system compares the physical address generated by performing the preset operation on the applied logical address to the plurality of second physical addresses, and checks whether there exists a second physical address coinciding with the physical address,
- when the second physical address coinciding with the physical address may exist, the second memory system rechecks whether the logical address connected to the corresponding second physical address exists,
- when the logical address connected to the corresponding second physical address does not exist, the second memory system stores the applied logical address in the second table in a state where the applied logical address is connected to the corresponding second physical address, and
- when the logical address connected to the corresponding second physical address exists, the second memory system changes a second page corresponding to the corresponding second physical address among the plurality of second pages to an invalid state, and transmits the information to the host.

8. The data processing system of claim 7, wherein when the predetermined operation corresponding to the applied command is a read operation, the second memory system compares the physical address generated by performing the preset operation on the applied logical address to the plurality of second physical addresses, and checks whether there exists a second physical address coinciding with the physical address,
- when the second physical address coinciding with the physical address exists, the second memory system rechecks whether the logical address connected to the corresponding second physical address coincides with the applied logical address, and
- when the logical address coincides with the applied logical address, the second memory system performs the read operation from the second non-volatile memory device using the corresponding second physical address.

9. The data processing system of claim 1, wherein the preset operation comprises a hash operation for selecting and generating one physical address among the plurality of first physical addresses and the plurality of second physical addresses in response to the values of the applied logical addresses of which the number corresponds to the sum of the number of the first physical addresses and the number of the second physical address.

10. The data processing system of claim 1, wherein the preset operation comprises a binary search operation for selecting and generating one physical address among the plurality of first physical addresses and the plurality of second physical addresses in response to the values of the applied logical addresses of which the number corresponds to the sum of the number of the first physical addresses and the number of the second physical address.

11. A data processing system comprising:
- at least two memory systems including first and second memory systems to which a logical address and a command are applied in parallel from a host,
- wherein the first memory system including a first controller stores a plurality of first physical addresses for physically indicating a plurality of first pages included in a first non-volatile memory device as a first table, and the first controller determines whether to perform a preset operation corresponding to the applied command according to whether a physical address generated by performing a preset operation on the applied logical address exists in the first table, and
- the second memory system including a second controller stores a plurality of second physical addresses for physically indicating a plurality of second pages included in a second non-volatile memory device as a second table, and the second controller determines whether to perform the preset operation corresponding to the applied command according to whether a physical address generated by performing the preset operation on the applied logical address exists in the second table,
- wherein the first table stores the logical addresses for generating the plurality of first physical addresses through the preset operation in a state where the logical addresses correspond to the respective first physical addresses,
- wherein the first table stores duplication indication information indicating whether the logical addresses connected to the respective first physical addresses are duplicated, in a state where the duplication indication information is connected to the respective first physical addresses.

12. The data processing system of claim 11, wherein the first memory system comprises:
- the first non-volatile memory device comprising the plurality of first pages, and stores the first table; and
- the first controller generates a physical address by performing the preset operation on the applied logical address, checking whether the generated physical address exists in the first table stored in the first non-volatile memory device, and determining whether to perform the predetermined operation corresponding to the command according to the check result;

wherein the second memory system comprises:
- the second non-volatile memory device comprising the plurality of second pages, and suitable for storing the second table; and
- the second controller generates a physical address by performing the preset operation on the applied logical address, checking whether the generated physical address exists in the second table stored in the second non-volatile memory device, and determining whether to perform the predetermined operation corresponding to the command according the check result.

13. The data processing system of claim 11, wherein each of the first and second memory systems generate the physical address by performing the preset operation on the applied logical address in simultaneously.

14. The data processing system of claim 11, wherein when the preset operation corresponding to the applied command is a write operation, the first memory system compares the physical address generated by performing the preset operation on the applied logical address to the plurality of first physical addresses, and checks whether there exists a first physical address coinciding with the physical address,
- when the first physical address coinciding with the physical address exists, the first memory system rechecks whether the logical address connected to the corresponding first physical address exists,
- when the logical address connected to the corresponding first physical address does not exist, the first memory system stores the applied logical address and the duplication indication information in the first table in a state where the value of the applied logical address and the initial value of the duplication indication information are connected to the corresponding first physical address, and when the logical address connected to the corresponding first physical address exists, the first memory system selects any one first physical address having no logical address connected thereto among the plurality of first physical addresses, stores the value of the selected first physical address as the duplication indication information connected to the corresponding first physical address, and stores the applied logical address and the duplication indication information in the first table in a state where the value of the applied logical address and the initial value of the duplication indication information are connected to the selected first physical address.

15. The data processing system of claim 14, wherein when the preset operation corresponding to the applied command is a read operation, the first memory system compares the physical address generated by performing the preset operation on the applied logical address to the plurality of first physical addresses, and checks whether there exists a first physical address coinciding with the physical address, when the first physical address coinciding with the physical address exists, the first memory system rechecks whether the duplication indication information connected to the corresponding first physical address has the initial value, when the duplication indication information has the initial value, the first memory system rechecks whether the logical address connected to the corresponding first physical address coincides with the applied logical address, and performs the read operation from the first non-volatile memory device using the corresponding first physical address only in case where the logical address coincides with the applied logical address, and when the duplication indication information does not have the initial value, the first memory system selects a physical address having the same value as the duplication indication information connected to the corresponding first physical address among the plurality of first physical addresses, sets the selected first physical address to the corresponding first physical address, and repeats the rechecking operation until the duplication indication information connected to the corresponding first physical address becomes the initial value.

16. The data processing system of claim 11, wherein the second table stores the logical addresses for generating the plurality of second physical addresses through the preset operation in a state where the logical addresses correspond to the respective second physical addresses.

17. The data processing system of claim 16, wherein the second table stores duplication indication information indicating whether the logical addresses connected to the respective second physical addresses are duplicated, in a state where the duplication indication information is connected to the plurality of second physical addresses.

18. The data processing system of claim 17, wherein when the preset operation corresponding to the applied command is a write operation, the second memory system compares the physical address generated by performing the preset operation on the applied logical address to the plurality of second physical addresses, and checks whether there exists a second physical address coinciding with the physical address, when the second physical address coinciding with the physical address exists, the second memory system rechecks whether the logical address connected to the corresponding second physical address exists, when the logical address connected to the corresponding second physical address does not exist, the second memory system stores the applied logical address and the duplication indication information in the second stable in a state where the value of the logical address and the initial value of the duplication indication information are connected to the corresponding second physical address, and when the logical address connected to the corresponding second physical address exists, the second memory system selects any one second physical address having no logical address connected thereto among the plurality of second physical addresses, stores the selected second physical address as the duplication indication information connected to the corresponding second physical address, and stores the applied logical address and the duplication indication information in the second table in a state where the value of the applied logical address and the initial value of the duplication indication information are connected to the selected second physical address.

19. The data processing system of claim 18, wherein when the preset operation corresponding to the applied command is a read operation, the second memory system compares the physical address generated by performing the preset operation on the applied logical address to the plurality of second physical addresses, and checks whether there exists a second physical address coinciding with the physical address, when the second physical address coinciding with the physical address exists, the second memory system rechecks whether the duplication indication information connected to the corresponding second physical address has the initial value, when the duplication indication information has the initial value, the second memory system rechecks whether the logical address connected to the corresponding second physical address coincides with the applied logical address, and performs the read operation from the second non-volatile memory device using the corresponding second physical address only in case where the logical address connected to the corresponding second physical address coincides with the applied logical address, and when the duplication indication information does not have the initial value, the second memory system selects a second physical address having the same value as the duplication information connected to the corresponding second physical address among the plurality of second physical addresses, sets the selected second physical address to the corresponding second physical address, and repeats the rechecking operation until the duplication indication information connected to the corresponding second physical address becomes the initial value.

20. The data processing system of claim 11, wherein the preset operation comprises a hash operation for selecting and generating one physical address among the plurality of first physical addresses and the plurality of second physical addresses in response to the values of the applied logical addresses of which the number corresponds to the sum of the number of the first physical addresses and the number of the second physical address.

21. The data processing system of claim 11, wherein the preset operation comprises a binary search operation for selecting and generating one physical address among the plurality of first physical addresses and the plurality of second physical addresses in response to the values of the applied logical addresses of which the number corresponds to the sum of the number of the first physical addresses and the number of the second physical address.

* * * * *